(12) United States Patent
Vinodkrishnan et al.

(10) Patent No.: US 7,424,702 B1
(45) Date of Patent: Sep. 9, 2008

(54) DATA INTEGRATION TECHNIQUES FOR USE IN ENTERPRISE ARCHITECTURE MODELING

(75) Inventors: Nalledath Palat Vinodkrishnan, Overland Park, KS (US); Thomas C. Gifford, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1443 days.

(21) Appl. No.: 10/285,884

(22) Filed: Nov. 1, 2002

Related U.S. Application Data

(60) Provisional application No. 60/404,824, filed on Aug. 19, 2002.

(51) Int. Cl.
*G06F 9/44* (2006.01)

(52) U.S. Cl. ............... 717/124; 717/126; 719/313; 719/330

(58) Field of Classification Search ......... 717/124–127; 719/313, 311, 330
See application file for complete search history.

(56) References Cited

U.S. PATENT DOCUMENTS

| | | | |
|---|---|---|---|
| 5,129,086 A | 7/1992 | Coyle et al. | |
| 5,761,510 A * | 6/1998 | Smith et al. | 717/124 |
| 5,848,273 A | 12/1998 | Fontana et al. | |
| 5,892,949 A | 4/1999 | Noble | |
| 5,903,758 A | 5/1999 | Walker | |
| 5,941,978 A | 8/1999 | Finni | |
| 5,966,531 A * | 10/1999 | Skeen et al. | 719/315 |
| 6,023,580 A | 2/2000 | Sifter | |
| 6,138,121 A | 10/2000 | Costa et al. | |
| 6,192,512 B1 | 2/2001 | Chess | |
| 6,334,158 B1 | 12/2001 | Jennyc et al. | |
| 6,385,496 B1 * | 5/2002 | Irwin et al. | 700/87 |
| 6,427,227 B1 * | 7/2002 | Chamberlain | 717/124 |
| 6,427,230 B1 | 7/2002 | Goiffon et al. | |
| 6,430,556 B1 | 8/2002 | Goldberg et al. | |
| 6,460,090 B1 | 10/2002 | Cuomo et al. | |
| 6,505,342 B1 * | 1/2003 | Hartmann et al. | 717/104 |
| 6,647,546 B1 * | 11/2003 | Hinker et al. | 717/137 |
| 6,687,735 B1 | 2/2004 | Logston et al. | |
| 6,698,011 B1 * | 2/2004 | Reinders et al. | 717/124 |
| 6,701,514 B1 | 3/2004 | Haswell et al. | |
| 6,721,807 B2 | 4/2004 | Vlissides | |
| 6,742,015 B1 | 5/2004 | Bowman-Amuah | |

(Continued)

OTHER PUBLICATIONS

Automated Testing of Classes, Ugo Buy et al, ACM, 2000, pp. 39-48.*

(Continued)

*Primary Examiner*—Todd Ingberg

(57) ABSTRACT

A device for modeling an integrated enterprise includes a first tool for constructing a model of the integrated enterprise and a second tool for analyzing calls, contained in the constructed model, between applications of the integrated enterprise and a database shared thereby. The call analysis tool identifies data attribute imbalances in calls between the applications of the integrated enterprise and the shared database. Data attribute imbalances result if the calls attempt to consume data which was never produced or if the calls produce data which is never consumed. The call analysis tool also generates producer/consumer maps of the data attributes used in the model, producer exception reports which identify data attributes which are consumed but never produced and consumer exception reports which identify data attributes which are produced but never consumed.

25 Claims, 11 Drawing Sheets

U.S. PATENT DOCUMENTS

| | | | |
|---|---|---|---|
| 6,802,057 B1 * | 10/2004 | Hinker et al. | 717/137 |
| 6,807,583 B2 | 10/2004 | Hrischuk et al. | |
| 6,874,146 B1 | 3/2005 | Iyengar | |
| 6,907,546 B1 | 6/2005 | Haswell et al. | |
| 6,928,393 B2 * | 8/2005 | Czerwonka | 702/186 |
| 6,931,630 B1 * | 8/2005 | Cotner et al. | 717/126 |
| 6,948,153 B2 | 9/2005 | Bowers | |
| 6,951,012 B2 | 9/2005 | McGeorge, Jr. | |
| 6,966,013 B2 * | 11/2005 | Blum et al. | 714/38 |
| 6,966,048 B2 | 11/2005 | Bowers | |
| 6,978,463 B2 | 12/2005 | Yanosy | |
| 6,986,124 B1 | 1/2006 | Field et al. | |
| 7,032,212 B2 * | 4/2006 | Amir et al. | 717/124 |
| 7,032,229 B1 | 4/2006 | Flores et al. | |
| 7,039,900 B2 | 5/2006 | Lecerf | |
| 7,055,130 B2 * | 5/2006 | Charisius et al. | 717/108 |
| 7,062,772 B2 | 6/2006 | Underseth et al. | |
| 7,086,066 B2 | 8/2006 | Kappel et al. | |
| 7,089,530 B1 * | 8/2006 | Dardinski et al. | 717/105 |
| 7,096,465 B1 * | 8/2006 | Dardinski et al. | 717/178 |
| 7,124,401 B2 * | 10/2006 | Muller et al. | 717/124 |
| 7,159,209 B1 | 1/2007 | Srinivasan et al. | |
| 7,197,741 B1 * | 3/2007 | Stapf | 717/113 |
| 7,203,929 B1 | 4/2007 | Vinodkrishnan et al. | |
| 7,213,233 B1 | 5/2007 | Vinodkrishnan et al. | |
| 7,216,340 B1 | 5/2007 | Vinodkrishnan et al. | |
| 7,275,079 B2 * | 9/2007 | Brodsky et al. | 709/203 |
| 7,305,659 B2 * | 12/2007 | Muller et al. | 717/127 |

OTHER PUBLICATIONS

Rational Rose, Using Rational Rose 4.0, Rational Software Corporation, Whole Manual , 196.*

UML Based Integration Testing, Jean Hartman et al, ACM, 2000, pp. 60-70.*

Testing Levels for Object-Oriented Software, Y. Labiche et al, ACM, 2000, pp. 136-145.*

Rational Rose, Using Rational Rose 4.0, Rational Software Corporation, Whole Manual, 1996.*

"A Document-based Framework for Internet Application Control", Todd D. Hodes, et al., 1999. 18 pages.

"ADL—An Interface Definition Language for Specifying and Testing Software", Siram Sankar, et al., Sun, 1994, 9 pages.

Unified Modeling Language UML Booch & Omt, Quick Reference for Rational Rose 4.0, 1996, 10 pages.

Inside CORBA Distributed Object Standards and Applications, Thomas J. Mowbray, et al., 1997, p. 251.

SNAP Foundation Template Using the SNAP Permanent Storage Component, Template Software, 1998, Chapter 1-4.

SNAP Foundation Template Using the SNAP Development Environment, Template Software, 1998, Chapter 1-7. (Part 1, 114 pages).

SNAP Foundation Template Using the SNAP Development Environment, Template Software, 1998, Chapter 1-7. (Part 2,147 pages).

A UML Testing Framework, Martin Fowler, Apr. 1999, 7 pages.

"Using Rational Robot", Rational Software, Dec. 1998, Part No. 800-011590-000, Whole Manual.

Lavanya Srinivasan, et al., Data Validation Tool for Enterprise Architecture, filed Aug. 7, 2003, U.S. Appl. No. 10/636,121, Specification (43 pgs.) and Drawings (16 sheets). (4000-11300).

Office Action dated Mar. 9, 2006 (12 pages), entitled "Inter-Application Validation Tool For Use In Enterprise Architecture Modeling," U.S. Appl. No. 10/285,938, filed Nov. 2, 2002.

Office Action dated Sep. 22, 2006 (13 pages), entitled "Modeling Standards Validation Tool For Use In Enterprise Architecture Modeling," U.S. Appl. No. 10/329,436, filed Dec. 26, 2002.

Office Action dated Mar. 14, 2006 (13 pages), entitled "Modeling Standards Validation Tool For Use In Enterprise Architecture Modeling," U.S. Appl. No. 10/329,436, filed Dec. 26, 2002.

Final Office Action dated Oct. 17, 2006 (14 pages), entitled "Analysis Data Validation Tool For Use In Enterprise Architecture Modeling," U.S. Appl. No. 10/286,526, filed Nov. 1, 2002.

Office Action dated Mar. 23, 2006 (13 pages), entitled "Analysis Data Validation Tool For Use In Enterprise Architecture Modeling," U.S. Appl. No. 10/286,526, filed Nov. 1, 2002.

* cited by examiner

** EAI Report Page **

_ICD - Scenario Based Analysis Report_

ICD Report- Data Attribute Analysis

Sequence Diagrams Analysed :
DaDI Install
DaDI Install System Error

| Attribute Name | Producer | | | Consumer | | | Modifier | |
|---|---|---|---|---|---|---|---|---|
| | Sequence Diagram | Operation Name | | Sequence Diagram | Operation Name | | Sequence Diagram | Operation Name |
| directoryMsg | DaDI Install | create Directory Msg | | DaDI Install | retrieve Directory Message Information | | NO UPDATES | |
| | DaDI Install | create Directory Message | | DaDI Install | retrieve Directory Msg | | | |
| | DaDI Install System Error | create Directory Msg | | DaDI Install System Error | retrieve Directory Message Information | | | |
| | DaDI Install System Error | create Directory Message | | | | | | |
| | DaDI Install | create Directory Message | | DaDI Install | retrieve Directory Msg | | NO UPDATES | |

FIG. 6

DATA INTEGRATION TECHNIQUES FOR USE IN ENTERPRISE ARCHITECTURE MODELING

CROSS-REFERENCE TO RELATED APPLICATIONS

This application is related to U.S. Provisional Application Ser. No. 60/404,824, filed Aug. 19, 2002 and entitled "Enterprise Architecture Development Process."

This application is also related to U.S. patent application Ser. Nos. 10/285,938 entitled "An Inter-Application Validation Tool For Use In Enterprise Architecture Modeling" 10/286,526 entitled "An Analysis Data Validation Tool For Use In Enterprise Architecture Modeling," both of which were filed on even date herewith, assigned to the Assignee of the present application and hereby incorporated by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to data integration techniques for use in enterprise architecture modeling. By analyzing operations to a shared database forming part of a model of an enterprise based upon the usage of data attributes, the shared database may be integrated into the enterprise.

BACKGROUND OF THE INVENTION

The rapid evolution of computer and communication technologies coupled with the robust economies of the 1980s and 1990s resulted in unprecedented growth in the information technology ("IT") field. During this period, the need to establish a competitive advantage drove companies to faster and faster rates of change to support new product offerings and expanded services. As a result of these market pressures and time constraints, most companies elected to support new products and services by adding additional back office systems. However, due to the lack of mature integration technologies, the new systems were connected to the existing IT systems by making direct connections to the software routines already in use. The vulnerability of this design is that a change in one system produces a "ripple effect" change in every system it connects with. Over time, this incremental stacking of software systems can result in an integration ceiling. That is, at a certain point, more effort is spent on the connections than on new functionality and further expansion becomes cost prohibitive.

In the late 1990s, new integration technologies emerged that made it possible to "loosely couple" applications so that systems are no longer directly connected. Thus, changes in one system would not cause a ripple effect in any other systems. The most notable of these technologies are Message Oriented Middleware ("MOM"), Publish and Subscribe messaging, and Object Request Brokers ("ORBs"). These technologies enabled companies to re-architect their conglomeration of systems into an architecture that allows them to expand in a cost-effective manner. Technologies such as these that address the problem of integrating existing systems with new systems in an organized, efficient, and economically scaleable manner can be referred to collectively as enterprise application integration ("EAI") technologies.

An integrated enterprise may have any number of applications which interact with one or more shared databases (also referred to as an integrated information store ("IIS")) of the integrated enterprise through a data access layer ("DAL"). Among other things, interface control documents ("ICDs") for an integrated enterprise describes all of the application-to-database operations taking place within the integrated enterprise. An interaction with a database of an integrated enterprise is typically in the form of a "call" comprised of a first (or "logical operation name") portion, a second (or "logical data aggregate name") portion and a third (or "data attribute") portion. The logical operation name portion of the call describes the type of application-database operation to be conducted, the logical data aggregate name portion of the call describes the name of the data to which the operation is applied and the data attribute portion of the call is comprised of one or more data attributes, each of which describes a discrete characteristic of the data involved in the application-database operation.

Application-database operations may be divided into two types of operations—those that produce data and those that consume data. As defined herein, data producing operations are those operations which involve data being written to a database. Data consuming operations, on the other hand, are herein defined as those operations which involve data being read from a database. Many problems in application-database operations arise when a system designer fails to ensure that a correspondence exists between the data produced and the data consumed. In other words, application-database operations which involve consuming data which was never produced (hereafter referred to as a "producer exception") or producing data which is never consumed (hereafter referred to as a "consumer exception") should be avoided. Of the two, the former is a more serious problem. Since data cannot be consumed before it is produced, a producer exception causes an error in the system. Conversely, while a consumer exception does not cause a system error, since there is no reason to produce data which is never consumed, a consumer exception unnecessarily wastes system resources.

While such errors exist in a model of an enterprise, that enterprise cannot truly be viewed as integrated. However, errors such as these can only be identified through a detailed manual examination of the ICD documents which model the enterprise. Such a task can be quite difficult, however, in view of how ICD documents are structured. For example, an ICD document constructed using RATIONAL ROSE, a unified modeling language ("UML") modeling tool commercially available through Rational Software Corporation of Cupertino, Calif. and Lexington, Mass., is configured hierarchically in the manner illustrated in FIG. 1.

As may be seen in FIG. 1, an ICD document 1 is comprised of plural classes, one of which is shown in FIG. 1 as class 2. Each class models information and associated behavior which must be stored. For example, the class 2 may be a sequence diagram forming part of the ICD document 1. The behavior of the class 2 is comprised of one or more operations. By way of example, the behavior of the class 2 is shown as being comprised of first and second operations 3 and 4, each of which are operations conducted by the class 2. In turn, each operation 3 and 4 includes one or more data attributes. Again, by way of example, the operation 3 includes first and second data attributes 5 and 6 while the operation 4 includes first and second data attributes 7 and 8. Each data attribute 5 and 6, 7 and 8 describes an element of the data involved in the corresponding operation 3, 4 which the operation is conducted. However, as the number of data attributes associated with each operation and the number of operations conducted by each class increases beyond the simple example illustrated in FIG. 1, the task of locating two occurrences of an attribute, one associated with a data producing operation and the other associated with a data consuming operation becomes increasingly difficult. Thus, the task of integrating the enterprise by correcting such errors remains a difficult one. It is, therefore, the object of this invention to provide a new and simpler technique to integrate an enterprise.

SUMMARY OF THE INVENTION

In one embodiment, the present invention is directed to a method of modeling an enterprise by constructing an interim model of the enterprise, analyzing producers and consumers of data within the interim model of the enterprise and producing an integrated model of the enterprise by using the analysis of producers and consumers of data within the interim model to integrate a shared database into the interim model of the enterprise. In one aspect thereof, analysis of the producers and consumers of data within the interim model is performed by analyzing calls to the shared database on a data attribute-by-data attribute basis. In another aspect thereof, analysis of the producers and consumers of data within the interim model is performed by identifying data which is consumed but not produced or by identifying data which is produced but not consumed. In still another aspect thereof, a shared database is integrated into the interim model of the enterprise by revising the interim model of the enterprise such that the integrated model produces the data identified as consumed but not produced or by revising the interim model of the enterprise such that the integrated model produces the data identified as produced but not consumed.

In another embodiment, the present invention is directed to a method of constructing an integrated model of an enterprise having a shared database. An interim model of the enterprise is first constructed. A scenario of the interim model is then selected for further analysis. The interim model is comprised of a set of sequence diagrams while the scenario is comprised of a subset of the set of sequence diagrams. A map of data producers and data consumers is then generated from the selected scenario. The map identifies at least one data attribute contained in the scenario and each producer and consumer of each of the at least one identified data attribute. An exception for each one of the at least one data attribute produced but not consumed or consumed but not produced is also generated from the scenario. The interim model of the enterprise is then integrated using the generated map and exceptions to produce the integrated model of the enterprise. In one aspect thereof, the interim model of the enterprise is integrated by modifying usage of each one data attribute contained in the scenario and identified by a generated exception as being produced but not consumed or consumed but not produced.

In still another embodiment, the present invention is directed to a method of integrating a model of an enterprise. In accordance with this embodiment, calls between at least two applications of the integrated enterprise and a shared database are analyzed. A determination is then made as to whether the analyzed calls contain a data imbalance. A data imbalance occurs if the analyzed calls include a data attribute contained in calls of a first call type but not contained in calls of a second call type. If a data imbalance is detected, the model of the enterprise is revised to remove the data imbalance. In various aspects thereof, the first and second call types may include data producing calls and/or data consuming calls. In further aspects thereof, an exception report listing the data attributes identified as being contained in at least one of the analyzed calls of the first type but not contained in any of the analyzed calls of the second type is generated. Variously, the exception report may be a listing of consumer exceptions in which data is produced but not consumed or producer exceptions in which data to be consumed was never produced.

In still other aspects of this embodiment of the invention, after identifying the data attributes contained in calls of the first call type but not contained in calls of the second call type, the data imbalance is removed by revising the model such that each one of the identified data attributes is contained in at least one call of the first call type and at least one call of the second call type. Variously, the model may be revised by adding at least one call of the second call type or revising at least one call of the second call type. In the alternative, the data imbalance may be removed by revising the model such that each one of the identified data attributes is no longer contained in any of the calls of the first call type. Variously, the model may by revised by deleting at least one call of the first call type or by revising at least one call of the first call type.

In still yet another embodiment, the method is directed to a method of integrating a hierarchical model of an enterprise. In accordance with this embodiment of the invention, the hierarchical model of the enterprise is inverted and the inverted hierarchical model subsequently analyzed. The hierarchical model of the enterprise is then modified based upon the analysis of the inverted hierarchical model. In one aspect thereof, the hierarchical model of the integrated enterprise includes first, second and third levels. Of these, the first level identifies at least one task to be performed by the integrated enterprise; the second level identifies, for each such task, at least one operation forming part of the task; and the third level identifies, for each operation forming part of one of the tasks, at least one data attribute associated with the operation. In another, the inverted hierarchical model of the integrated enterprise includes first and second levels. Of these, the first level identifies at least one data attribute, each associated with one or more operations; and the second level identifies each one of the operations associated with each one of the data attributes. In still yet another, the second level of the inverted hierarchical model further identifies, for each one of the one or more operations associated with each one of the data attributes, the task for which the operation was conducted in connection therewith.

In still other aspects thereof, the inverted hierarchical model is analyzed by classifying each operation as either a data producing type operation or as a data consuming type operation. In yet another aspect, analysis of the inverted hierarchical model further includes constructing a producer exception report listing each data attribute associated with at least one data consuming operation but not associated with any data producing operations. If so, the hierarchical model of the enterprise may be modified such that each data attribute listed in the producer exception report is associated with at least one data producing operation. In still another aspect, analysis of the inverted hierarchical model further includes constructing a consumer exception report listing each one data attribute associated with at least one data producing operation but not associated with any data consuming operation. If so, the hierarchical model of the enterprise may be modified such that each data attribute listed in the consumer exception report is associated with at least one data consuming operation.

DESCRIPTION OF DRAWINGS

FIG. 4b is a flowchart of a producer/consumer map subroutine of the method of FIG. 4a.

FIG. 6 is a producer/consumer map constructed by applying the method of FIG. 4a to a selected portion of an ICD document.

DETAILED DESCRIPTION OF THE INVENTION

Figure 2:
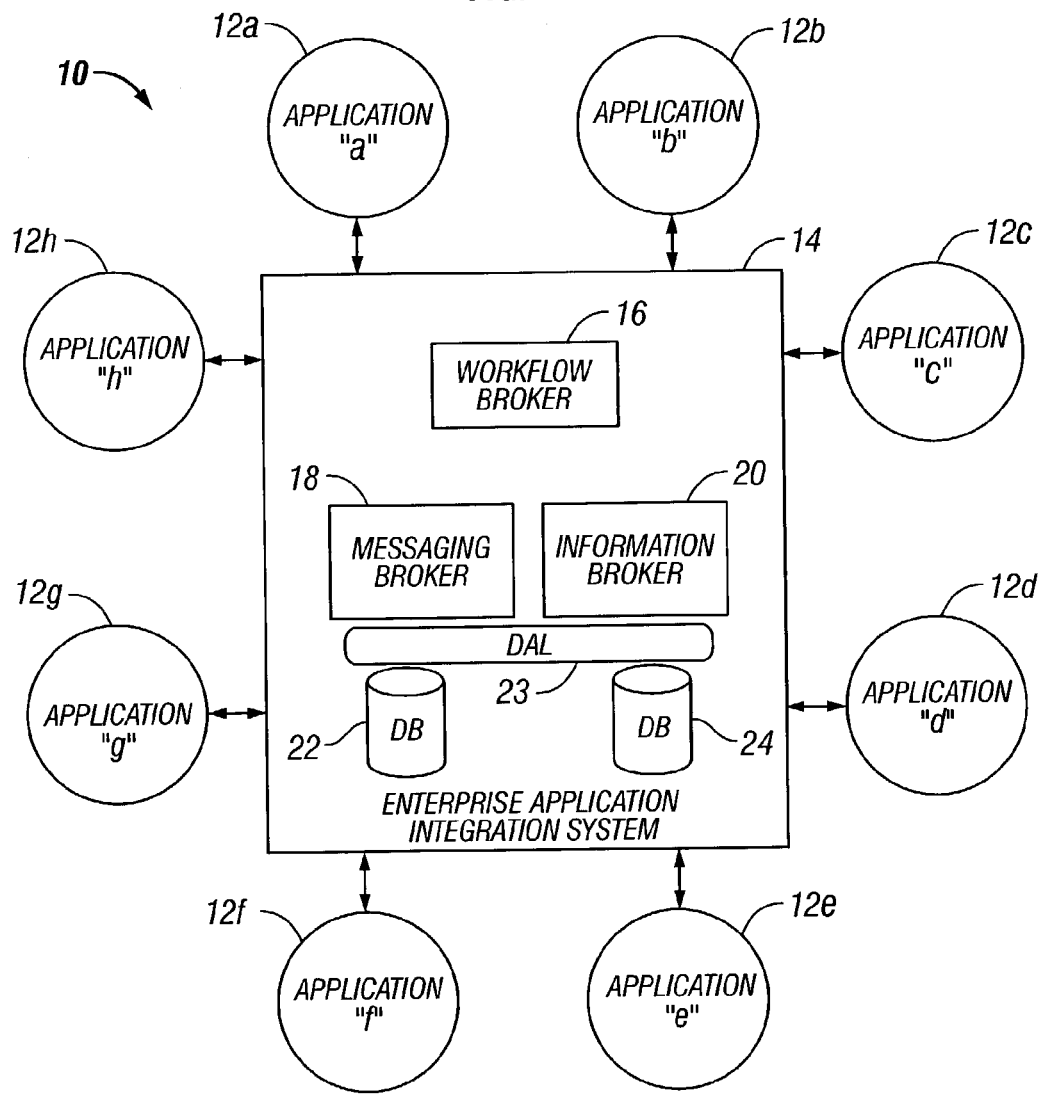
FIG. 2 is a block diagram of an integrated enterprise.

Turning now to FIG. 2, an integrated enterprise 10 will now be described in greater detail. As may now be seen, plural applications have been integrated into the integrated enterprise 10 by an EAI system 14. In the embodiment of the invention disclosed herein, a first application 12a, a second application 12b, a third application 12c, a fourth application 12d, a fifth application 12e, a sixth application 12f, a seventh application 12g and an eighth application 12h have all been integrated into the integrated enterprise 10. It should be clearly understood, however, that any number of applications may be integrated into the integrated enterprise 10. Once integrated into the enterprise 10, any of the applications 12a through 12h may exchange messages with any of the other applications integrated into the integrated enterprise 10 or access any of the databases shared by the integrated enterprise 10. As illustrated in FIG. 2, a first database 22 and a second database 24 are shared by the integrated enterprise 10. Of course, it is fully contemplated that any number of databases ("DBs") may be shared by the integrated enterprise 10. Furthermore, while FIG. 2 shows the integrated enterprise 10 as being comprised of plural applications and plural databases integrated together by the EAI system 14, it is fully contemplated that a wide variety of other types of devices may be integrated into, and form part of, the integrated enterprise 10.

The EAI system 14 includes plural components which collectively enable integration of the integrated enterprise 10 so that the aforementioned inter-application exchange of messages and/or access of shared databases may be conducted. The components of the EAI system 14 which enable such exchanges and/or accesses include a workflow broker ("WB") 16, a messaging broker 18 and an information broker ("IB") 20. While a complete description of the operation of the workflow broker 16, the messaging broker 18 and the information broker 20 is beyond the scope of this application, briefly, using a set of pervasive services (not shown), the workflow broker 16, the messaging broker 18 and the information broker 20 implement specific business logic to integrate the enterprise 10. More specifically, the messaging broker 18 enables system integration at either the application level (the applications 12a through 12h) or the database level (the shared databases 22 and 24). Once an event is defined, or "published", in a source system, other systems interested in that event can "subscribe" to the published event. The messaging broker 18 then attends to delivery of event messages to subscribing systems.

The workflow broker 16 is responsible for process integration and enables business automation capabilities. To initiate work, an application, for example, the application 12a, interfaces with the workflow broker 16 through the messaging broker 18. Finally, the information broker 20 abstracts systems from the shared databases 22 and 24. On one end, the information broker 20 attaches itself to a logical data structure, more specifically, data access layer ("DAL") 23, within the shared databases 22 and 24 and, on the other end, exposes interfaces to systems that require data to be persisted to disparate databases. In this manner, the information broker 20 provides an efficient mechanism for applications, for example, the applications 12a through 12h, to access the shared databases 22 and 24. Of course, it should be clearly understood that the foregoing description of the workflow broker 16, the messaging broker 18 and the information broker 20 has been greatly simplified for ease of understanding. It should be further understood that, as described and illustrated herein, the EAI system 14 has been greatly simplified in that other components of the EAI system 14 which, like the workflow broker 16, the messaging broker 18 and the information broker 20, contribute to the integration of the enterprise 10 have been omitted from the drawing for ease of description.

Figure 3:
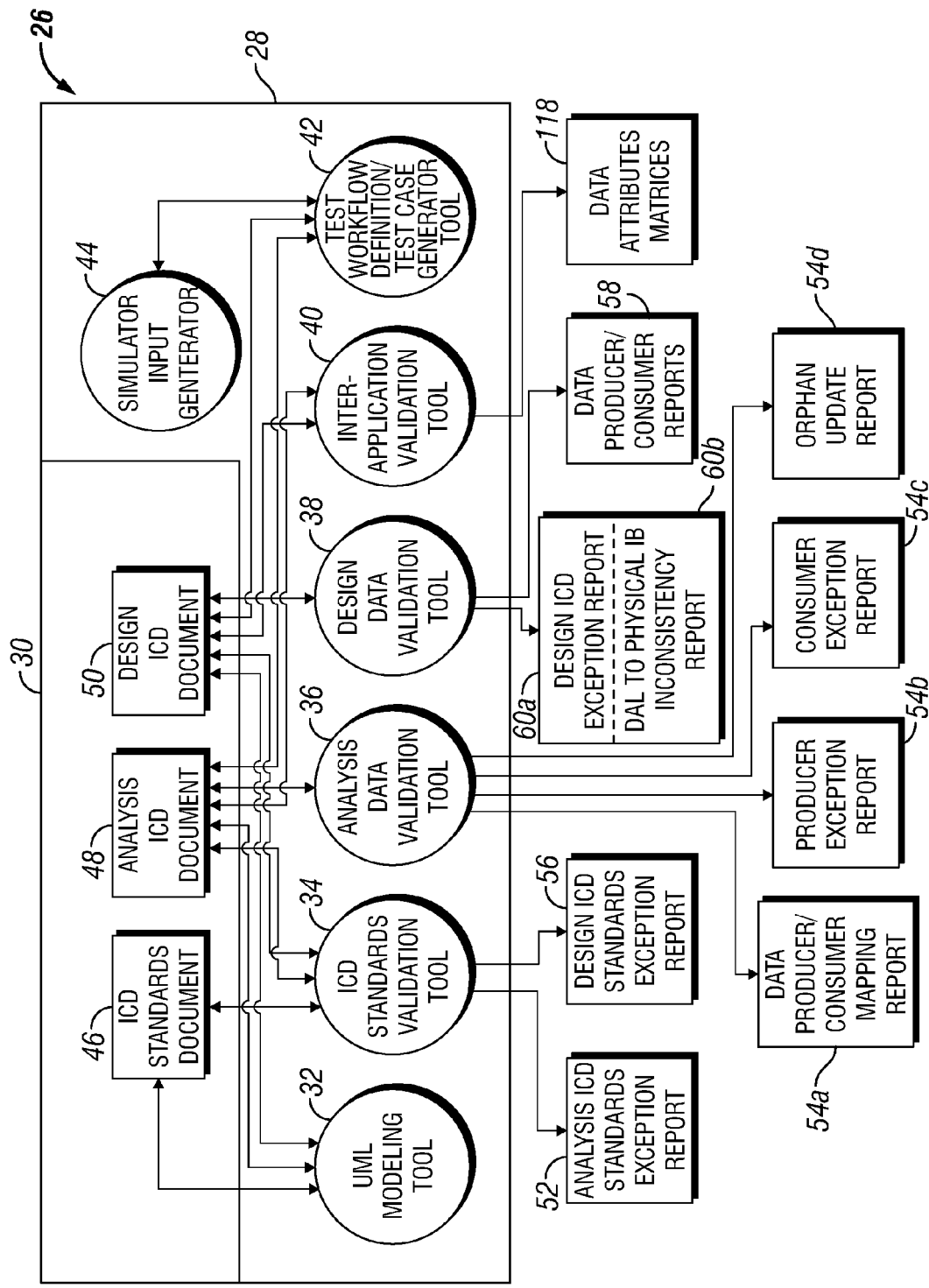
FIG. 3 is a device for constructing a model of the integrated enterprise of FIG. 2.

Referring next to FIG. 3, a device 26 for constructing a model of the integrated enterprise 10 of FIG. 2 will now be described in greater detail. The integrated enterprise modeling device 26, which typically resides within a computer system, for example, a personal computer ("PC") having a processor subsystem 28 and a memory subsystem 30 coupled to one another, is comprised of first, second, third, fourth, fifth, sixth and seventh tools 32, 34, 36, 38, 40, 42 and 44. Each one of the tools 32 through 44 is a software application comprised of a series of instructions encoded in the memory subsystem 30 of the integrated enterprise modeling device 26 as computer readable program code and executable by the processor subsystem 28 of the integrated enterprise modeling device 26. As used herein, the term "processor subsystem" refers to the collective processing capacity of the computer system in which the integrated enterprise modeling device 26 resides. Similarly, as used herein, the term "memory subsystem" refers to the collective memory capacity of the computer system in which the integrated enterprise modeling device 26 resides. While it is contemplated that, in one embodiment of the invention, the computer system may be exclusively dedicated to the functionality which embodies the integrated enterprise modeling device 26, more typically, the computer system will be configured to provide additional functionality and will include a platform (not shown), for example, the Windows NT platform manufactured by Microsoft Corporation of Redmond, Wash., from which the integrated enterprise modeling device 26 is launched. As will be more fully described below, after launching the integrated enterprise modeling device 26 from the Windows NT platform, a computer user models the integrated enterprise 10 by constructing a series of documents, which include first, second and third documents 46, 48 and 50, using the tools 32 through 44. The documents created by the computer user and subsequently stored in the memory subsystem 30 collectively describe the integrated enterprise 10. Of course, it should be clearly understood that, as described and illustrated herein, the integrated enterprise modeling device 26 has been greatly simplified and that various ones of the documents constructed during the modeling process and/or the tools used to construct those documents have been omitted for ease of description.

The first (or "ICD standards") document 46 documents the guidelines with which the second (or "analysis ICD") document 48 and the third (or "design ICD") document 50 are to be subsequently constructed. The ICD standards document 46 is constructed using a word processing application (not shown), for example, Microsoft Word. The analysis ICD document 48 and the design ICD document 50, on the other hand, both identify the sequence of events exchanged between applications, the interfaces between applications and brokers and the interfaces between applications. Typically, the design ICD document 50 differs from the analysis ICD document 48 in that the design ICD document 50 also captures database mapping between the data access layer 23 and the physical layer of the shared databases 22 and 24 for the integrated enterprise 10. The analysis ICD document 48 and the design ICD document 50 are both constructed using the first (or "UML modeling") tool 32. The UML modeling tool 32 used to construct the analysis ICD document 48 and the design ICD document 50 may be any one of a number of commercially available software applications. For example, the aforementioned RATIONAL ROSE software application manufactured by Rational Software Corporation of Cupertino, Calif. and Lexington, Mass. would be suitable for constructing the analysis ICD document 48 and the design ICD document 50.

After the ICD standards document 46 is constructed using Microsoft Word or another word processing program, the UML modeling tool 32 applies the analysis ICD standards contained in the ICD standards document 46 to information, typically in the form of plural documents (not shown) describing the system requirements of the integrated enterprise 10 to be modeled to construct the analysis ICD document 48. After the analysis ICD document 48 is constructed, the ICD standards validation tool 34 checks the analysis ICD document 48 to determine that the analysis ICD document 48 complies with the analysis ICD standards set forth in the ICD standards document 46. After completing an analysis of the analysis ICD document 48, the ICD standards validation tool 34 generates an analysis ICD standards exceptions report 52 which, in turn, may be used as a guide in a subsequent modification of the analysis ICD document 48 (if needed) to place the analysis ICD document 48 into compliance with the analysis ICD standards set forth in the ICD standards document 46.

After the analysis ICD document 48 has been brought into compliance with the analysis ICD standards set forth in the ICD standards document 46, construction of an interim analysis model of the integrated enterprise 10 is complete and construction of an integrated analysis model of the integrated enterprise 10 commences. To do so, the analysis data validation tool 36 analyzes the analysis ICD document 48 to validate the various accesses of the shared databases 22 and 24 by the applications 12a through 12h of the integrated enterprise 10 which are described in the analysis ICD document 48. After completing an examination of the analysis ICD document 48, the analysis data validation tool 36 generates, for data attributes that are stored in and/or retrieved from the shared databases 22 and 24 by the applications 12a through 12h, an analysis data producer/consumer mapping report 54a, a producer exception report 54b, a consumer exception report 54c and an orphan update report 54d which identifies data attributes updated but never created. By identifying, in the analysis data producer/consumer reports 54a through 54d, (1) a map of producers and consumers of data attributes; (2) a first exception report identifying data attributes which one or more of the applications 12a through 12h seeks to consume but none of the applications 12a through 12h ever produced; and (3) a second exception report identifying data attributes produced by one or more of the applications 12a through 12h but never consumed by any of the applications 12a through 12f, the analysis data producer/consumer reports 54a through 54d may be used as a guide during a subsequent modification of the analysis ICD document 48, again using the UML modeling tool 32, to correct any errors contained in the analysis ICD document 48, thereby constructing an integrated analysis model of the integrated enterprise 10. Furthermore, it should be noted that, by modifying the analysis ICD document 48 based upon the information contained in the analysis data producer/consumer reports 54a through 54d, modeling errors contained in the analysis ICD document 48 may be identified and corrected relatively early in the modeling process. Finally, once the results of an application of the analysis data validation tool 36 against the analysis ICD document 48 indicates a correspondence between producers and consumers of data attributes, the analysis ICD document 48 may be deemed as having been validated for any further usages thereof.

Once the analysis ICD document 48 has been validated, the UML modeling tool 32 is then used to construct the design ICD document 50, this time by applying the design ICD standards contained in the ICD standards document 46 to information, typically comprised of the analysis ICD document 48 and additional documents describing the physical layer of the shared databases 22 and 24 to construct the design ICD document 50. After the design ICD document 50 is constructed, the ICD standards validation tool 34 checks the document to determine whether the design ICD document 50 complies with the design ICD standards set forth in the ICD standards document 46. After completing an analysis of the design ICD document 50, the ICD standards validation tool 34 generates a design ICD standards exceptions report 56 which, in turn, may be used as a guide in a subsequent modification of the design ICD document 50 into compliance with the design ICD standards set forth in the ICD standards document 46.

In accordance with the embodiment of the invention set forth herein, the ICD standards document 46 contains both the analysis ICD standards and the design ICD standards for the integrated enterprise 10. In further accordance with the disclosed embodiment, a single tool, specifically, the ICD standards validation tool 34, applies the analysis ICD standards and the design ICD standards contained in the ICD standards document 46 to the analysis ICD document 48 and the design ICD document, respectively, to produce the analysis ICD standards exception report 52 and the design analysis ICD standards exception report 56. It should be clearly understood, however, that, in alternate embodiments of the invention, the analysis ICD standards and the design ICD standards may be maintained in separate documents and, in further alternate embodiments of the invention, discrete tools, specifically, an analysis ICD standards validation tool and a design ICD standards validation tool, may be used to examine the analysis ICD document 48 and the design ICD document 50, respectively. Finally, in still another embodiment of the invention, the functionality residing in the ICD standards validation tool 34 may be placed within the analysis data validation tool 36 and the design data validation tool 38. In such an embodiment, the analysis data validation tool 36 would generate the analysis ICD standards exception report 52 while the design data validation tool 38 would generate the design ICD standards exception report 56, for example, at the same general time that the analysis data validation tool 36 and design data validation tool 38 generate analysis data producer/consumer reports 54a through 54d and design data producer/consumer reports 58, respectively.

After the design ICD document 50 has been brought into compliance with the design ICD standards set forth in the ICD standards document 46, construction of an interim design model of the integrated enterprise 10 is complete and construction of an integrated design model of the integrated enterprise 10 commences. To do so, the design data validation tool 38 analyzes the design ICD document 50 to validate the various accesses to the physical layer of the shared databases 22 and 24 by the applications 12a through 12h of the integrated enterprise 10 set forth therein. After completing an analysis of the design ICD document 50, the design data validation tool 38 generates design data producer/consumer reports 58 for physical data attributes that are stored in and/or retrieved from the shared databases 22 and 24 by the applications 12a through 12h. It should be clearly understood that the design data producer/consumer reports 58 include a design data producer/consumer mapping report 54a, a producer exception report 54b, a consumer exception report 54c and an orphan update report 54d and appear in the drawings as a single element purely for ease of illustration. The design data validation tool 38 will also generate a design ICD exception report 60a and a data access layer-to-physical database inconsistency report 60b to identify inconsistencies, within the design ICD document 50, in mapping attributes of the information broker 20 to the physical layer of the shared databases 22 and 24. By identifying, in the various design data producer/consumer reports 58, the design ICD exception report 60a and the data access layer-to-physical database inconsistency report 60b: (1) a map of producers and consumers of physical data attributes; (2) a first exception report identifying physical data attributes which one or more of the applications 12a through 12h seeks to consume but none of the applications 12a through 12h ever produced; (3) a second exception report identifying physical data attributes produced by one or more of the applications 12a through 12h but never consumed by any of the applications 12a through 12h; and (4) inconsistencies in mapping data attributes from the data access layer to the physical layer of the shared databases 22 and 24, the various design data producer/consumer reports 58, the design ICD exception report 60a and the data access layer-to-physical database inconsistency report 60b may be used as a guide during a subsequent modification of the analysis ICD document 48, thereby constructing an integrated design model of the integrated enterprise 10. As before, it should be noted that, by modifying the design ICD document 50 based upon the information contained in the design data producer/consumer reports 58, the design ICD exception report 60a and/or the data access layer-to-physical database inconsistency report 60b, modeling errors contained in the design ICD document 50 may be identified and corrected relatively early in the modeling process. Finally, once the results of an application of the design data validation tool 38 against the design ICD document 50 indicates a correspondence between producers and consumers of data attributes and the absence of any data access layer-to-physical database inconsistencies, the design ICD document 50 may be deemed as having been validated for any further usages thereof.

While the analysis data validation tool 36 and the design data validation tool 38 are used to identify errors in application-to-database calls within the model of the integrated enterprise 10, the inter-application validation tool 40 is used to identify errors in application-to-application calls within the model of the integrated enterprise 10 by analyzing the application-to-application calls within the model of the integrated enterprise 10 on a data attribute-by-data attribute basis. As disclosed herein, the inter-application validation tool 40 is suitable for use with either the analysis ICD document 48 and/or the design ICD document 50 which model the integrated enterprise 10. Typically, the inter-application validation tool 40 would be used to examine the analysis ICD document 48 subsequent to the examination thereof by the analysis data validation tool 36 and prior to construction of the design ICD document 50. Similarly, the inter-application validation tool 40 would be used to examine the design ICD document 50 subsequent to examination thereof by the design data validation tool 38.

The test workflow definition/test case generator tool 42 defines all of the integration scenarios that need to be tested during end-to-end testing and generates integration test cases for the integration scenarios from the analysis and design ICD documents 48 and 50. Finally, the simulator input generator 44, which uses the test workflow definition/test case generator tool 42, is an automated testing tool that allows simulation of external systems for interfaces testing. The simulator input generator 44 also generates the interface information required for simulating the interfaces.

Figures 1, 4A:
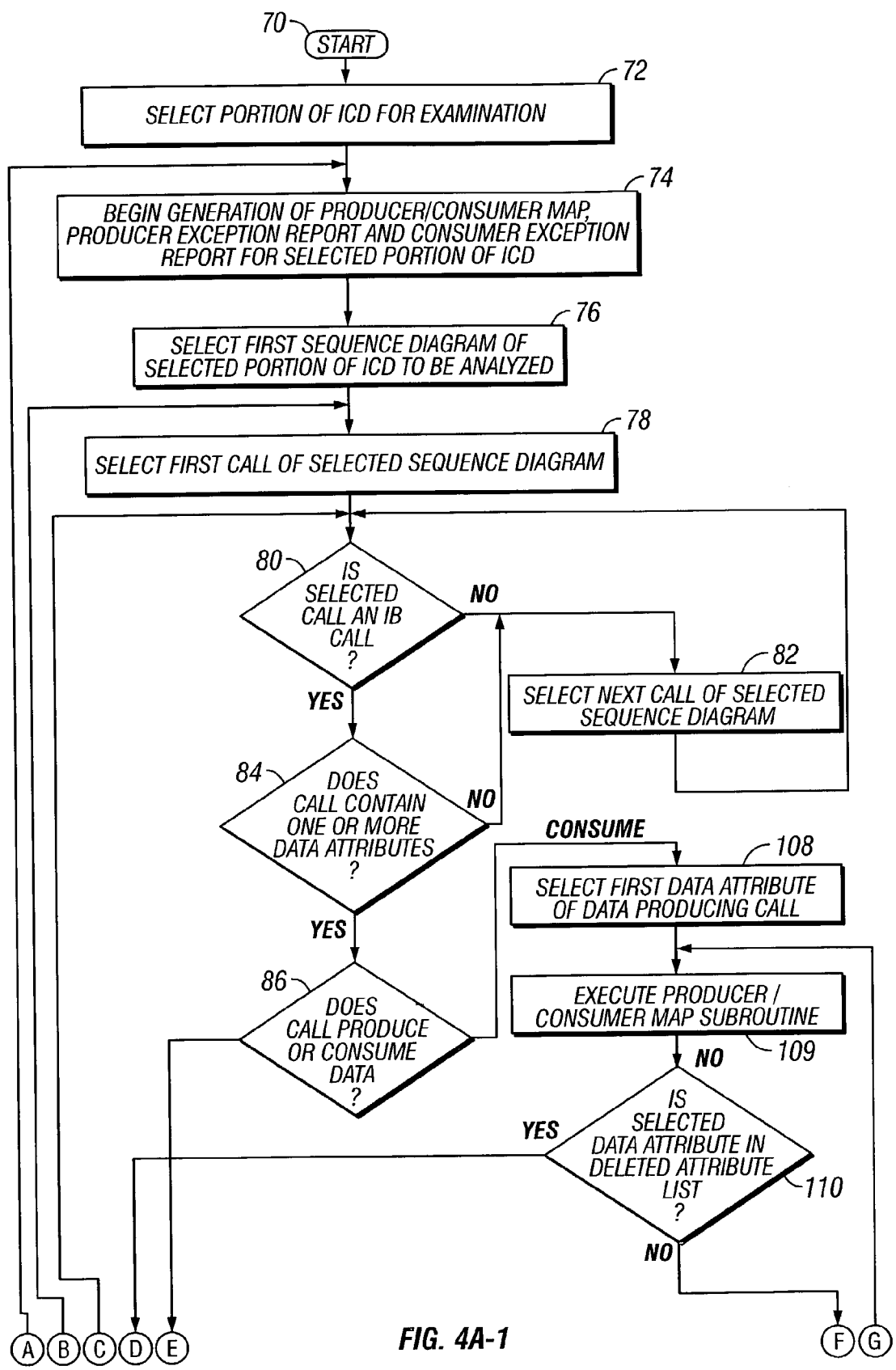
FIG. 4a is a flowchart of a method for analyzing a model of the integrated enterprise of FIG. 2.
Figures 2, 4A:
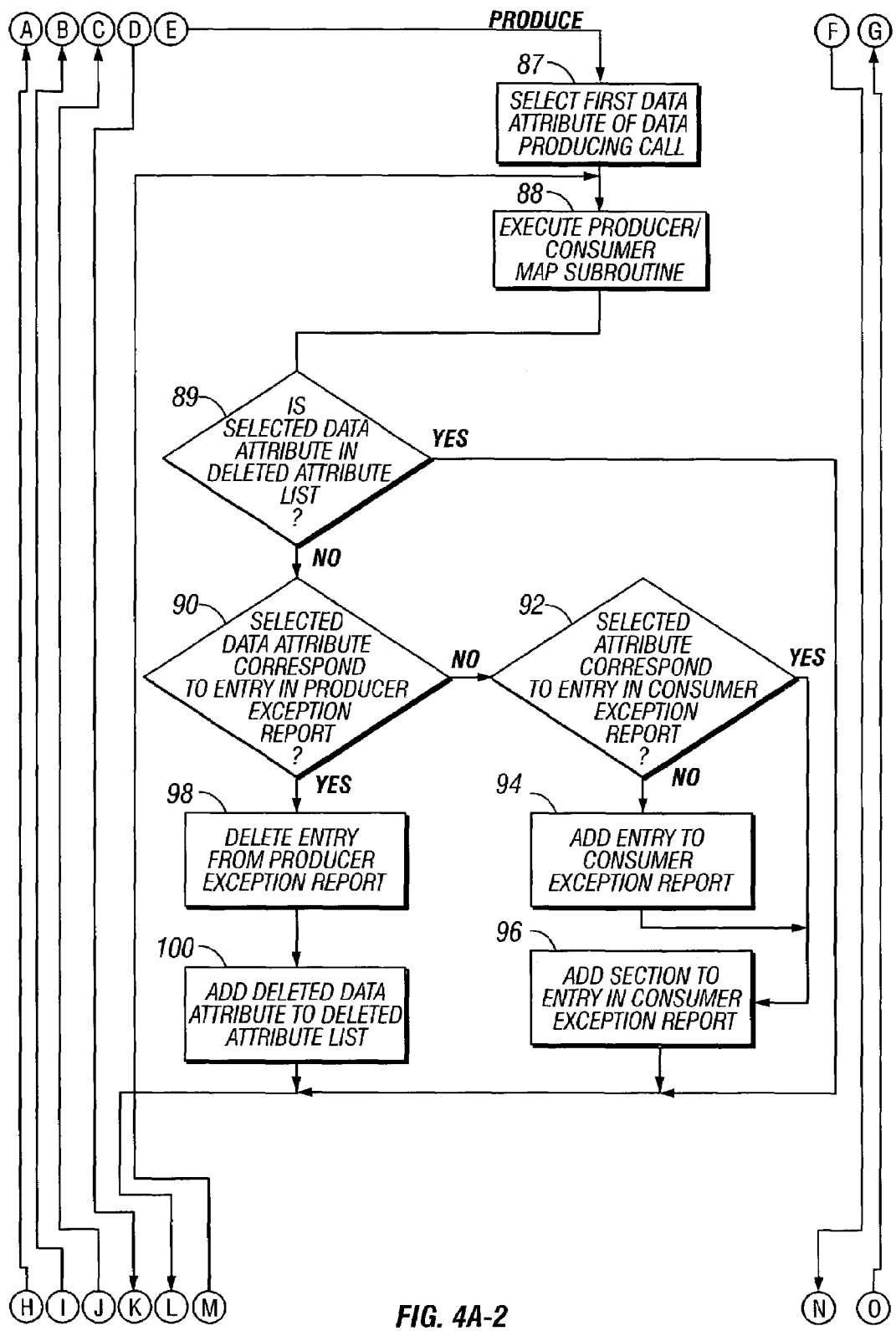
Figures 3, 4A:
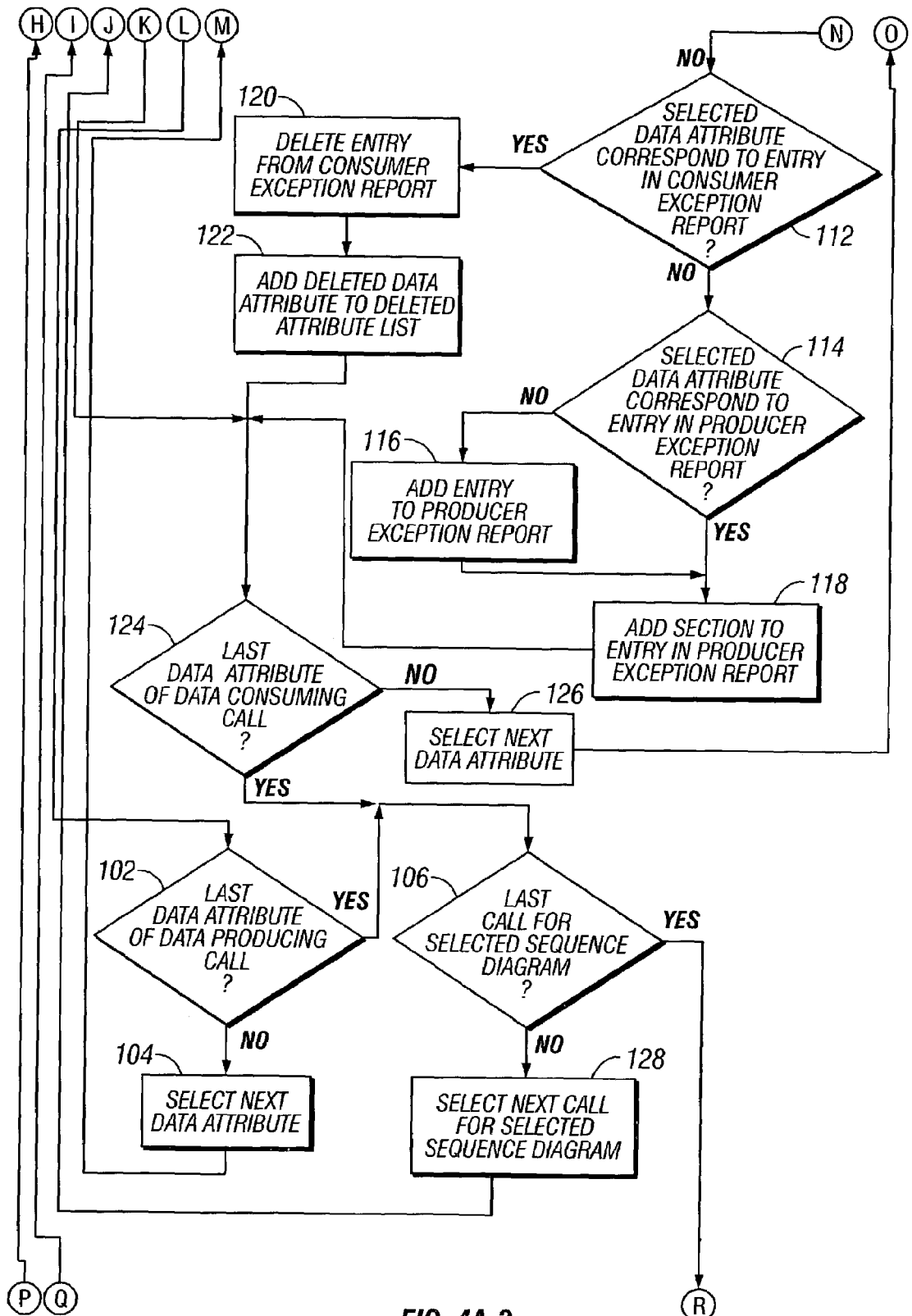

Referring next to FIG. 4a, a method for analyzing application-database operations for a model of an integrated enterprise, for example, the integrated enterprise 10 will now be described in greater detail. The techniques disclosed herein may be used in connection with a variety of modeling operations. For example, the disclosed techniques may be used to perform data integration on a model of an enterprise. As previously set forth, an enterprise typically has plural applications which share a database. The database is deemed to be integrated into the enterprise if the calls to the shared database by the plural applications do not create a data imbalance. For example, a data imbalance occurs if one of the applications attempts to consume data which was never produced. Thus, data integration is a technique in which calls to the shared database by the plural applications are modified until the shared database has been integrated into the enterprise. The disclosed techniques may also be used to perform data validation for a model of an enterprise. Data validation bears some similarity to data integration. In data validation, however, an enterprise is validated when all data for the enterprise which is produced is also consumed. Thus, an enterprise is deemed to be validated when there are neither producer nor consumer exceptions for the model of that enterprise.

Figure 5:
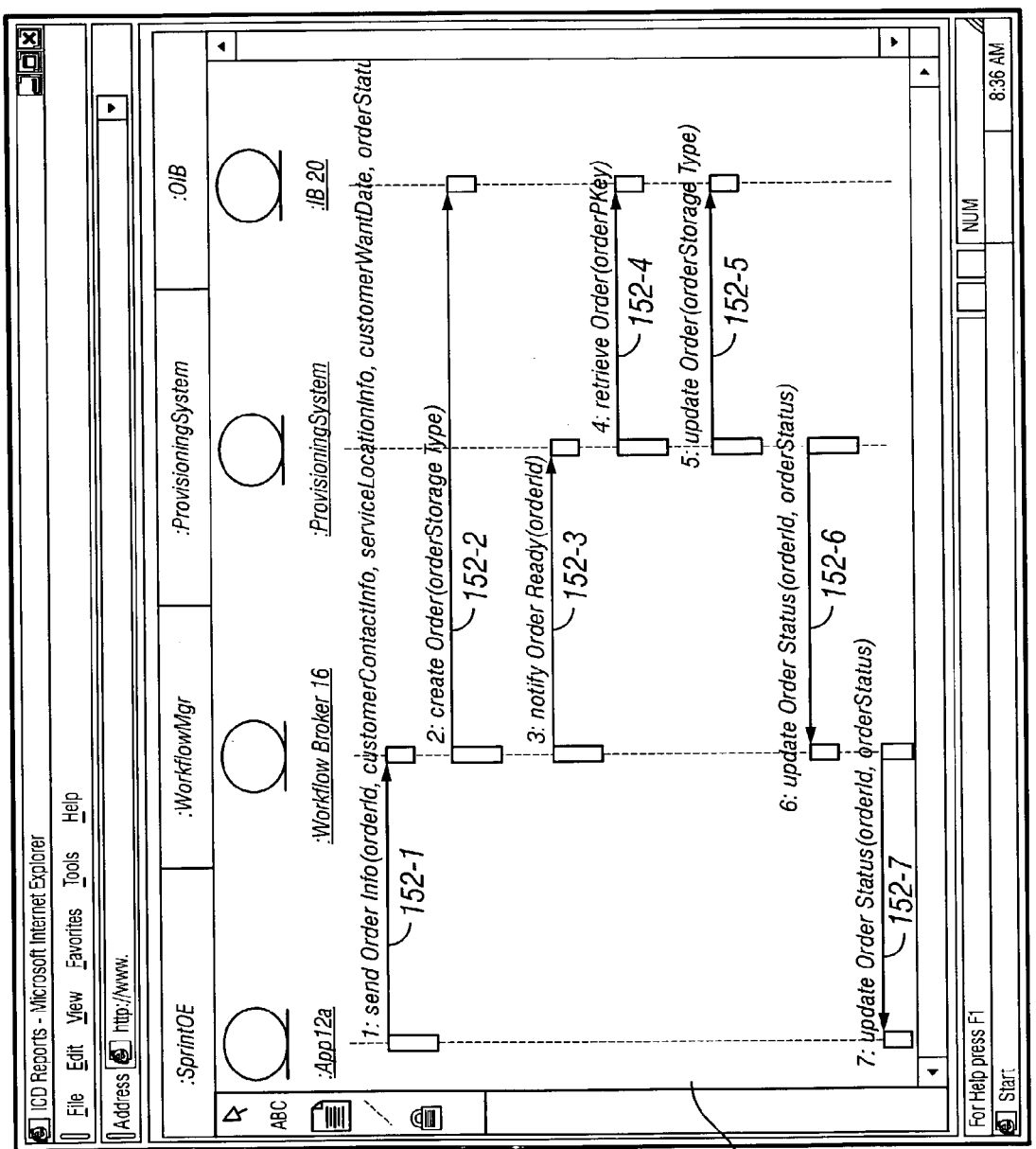
FIG. 5 illustrates a portion of an ICD document which models the integrated enterprise of FIG. 2.

Prior to describing this method, however, a brief description of an ICD document, for example, the analysis ICD document 48 or the design ICD document 50 and producer/consumer exception reports produced, by the analysis data validation tool 36 upon examination of the analysis ICD document 48 or by the design data validation tool 38 upon examination of the design ICD document 50, will greatly facilitate an understanding of the present invention. FIG. 5 illustrates a portion of an exemplary analysis ICD document 150, which is typically stored in the memory subsystem 30 of the integrated enterprise modeling device 26, as it is graphically displayed to the user by the UML modeling tool 32. The analysis ICD document 150 is comprised of plural sequence diagrams, of which only a first sequence diagram 151 may be seen in FIG. 5. Each sequence diagram, for example, the sequence diagram 151, describes a task to be performed by the integrated enterprise modeled by the analysis ICD document 150. To describe a task, the sequence diagram 151 identifies the applications, databases and/or other components of the enterprise involved in performing the task. For example, for the task described by the sequence diagram 151, the first application 12a, the workflow broker 16, a provisioning system (not shown) forming part of the EAI system 14 and the information broker 20 are involved in performing the task. Typically, each type of component involved in the task is represented, in the sequence diagram 114, by an iconic representation and the alphanumeric character string identifying the name of the application, broker or other type of component involved in the task.

Beneath the iconic representations/names of the components of the enterprise involved in the task described by the sequence diagram 151, a series of calls 152-1, 152-2, 152-3, 152-4, 152-5, 152-6 and 152-7 are listed in a descending order which corresponds to the order of execution when the task described by the sequence diagram 151 is performed. Each call has a source component and a target component. In the sequence diagram 151, each call forming part of the task is iconically represented by an arrow with the source component for the call generally aligned with the tail of the arrow and the target component for the call generally aligned with the head of the arrow. For example, the source component for the call 152-2 is the workflow broker 16 while the target component for the call 152-2 is the information broker 20. Positioned above each iconic representation of a call in the sequence diagram 151 is a description of the call. The description of each call is comprised of three portions—a logical operation name, a logical data aggregate portion and a data attribute portion. For example, the call 152-2 is comprised of the logical operation CREATE, the logical data aggregate "Order" and the data attribute "orderStorageType." Of course, the particular iconic representations used in the sequence diagram 151 are purely exemplary and it is fully contemplated that a wide variety of other iconic representations may be used in their stead.

Figures 4, 4A:
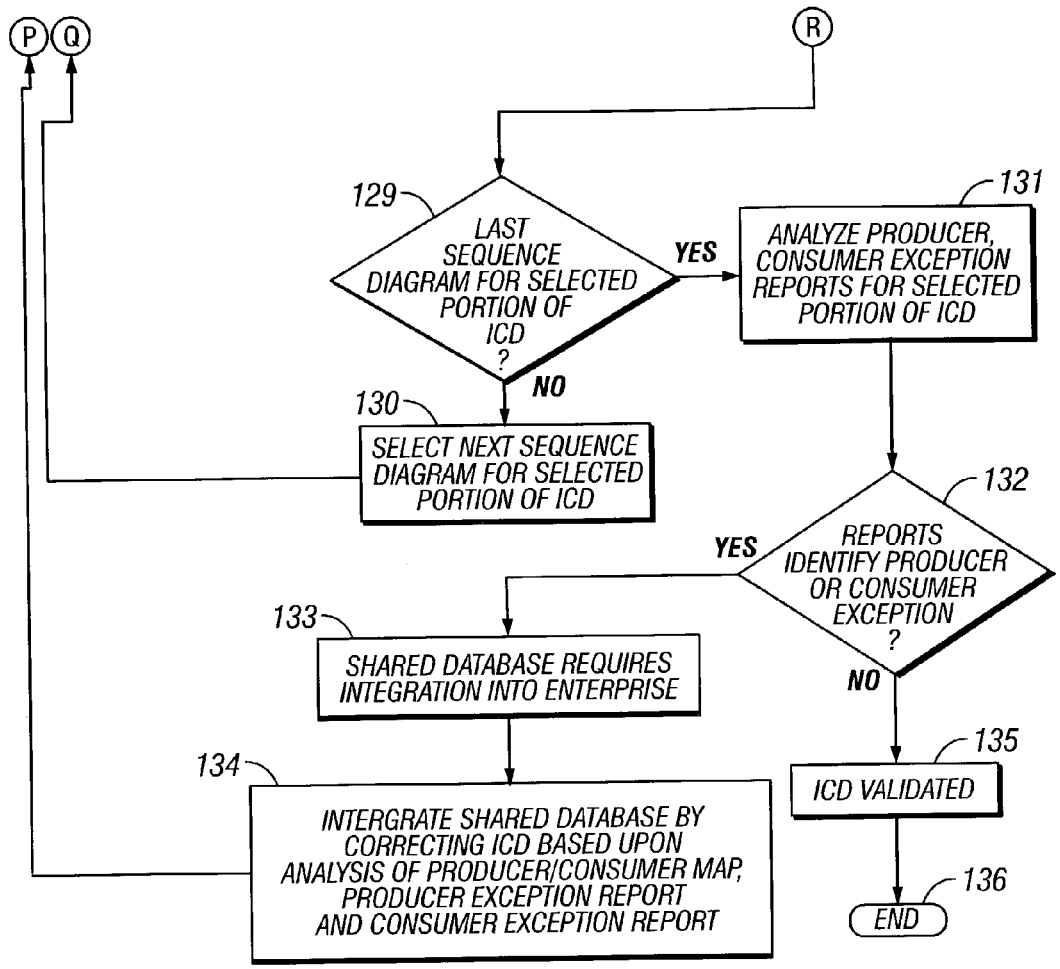
Figure 7:
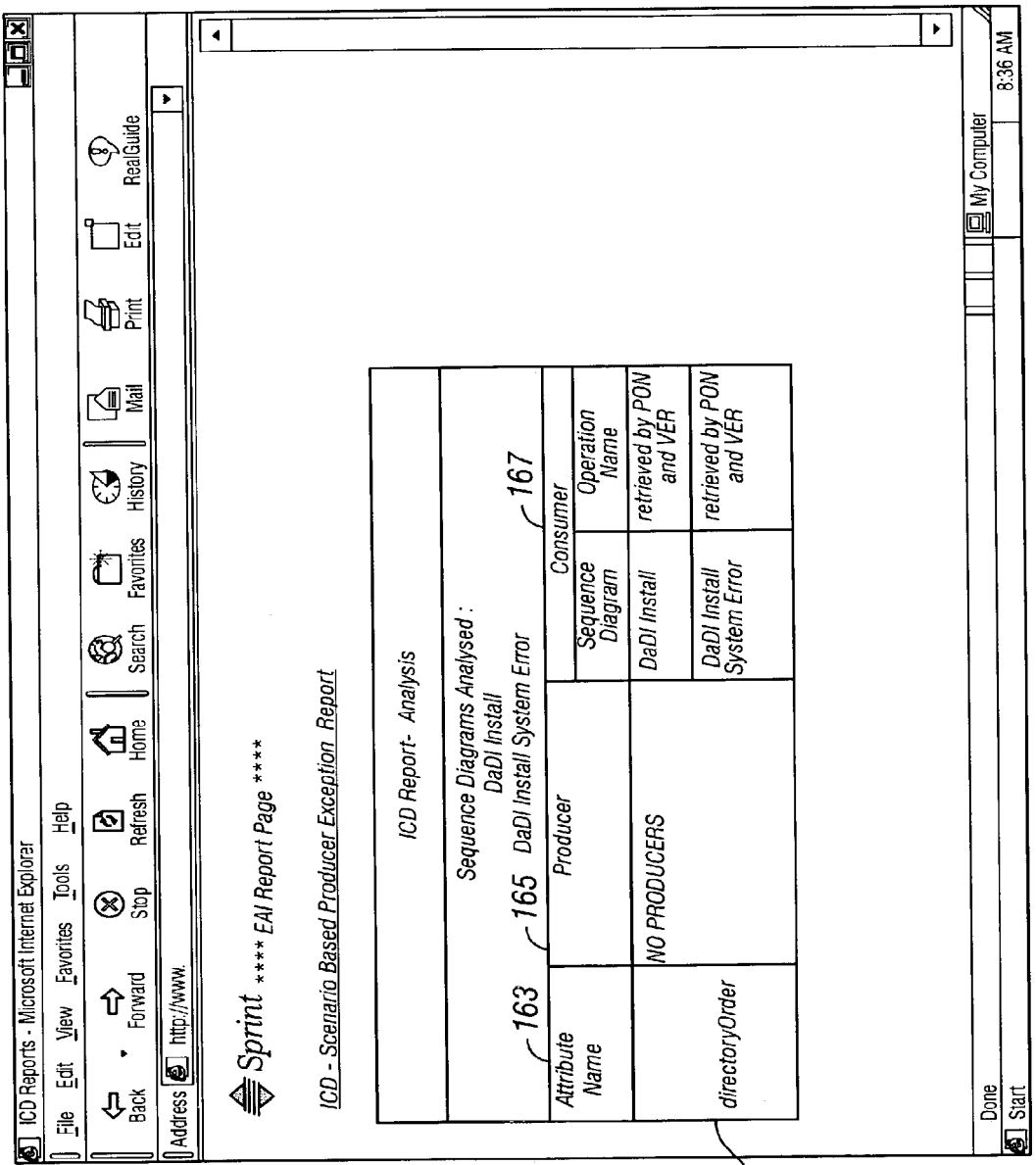
FIG. 7 is a producer exception report constructed by applying the method of FIG. 4a to a selected portion of an ICD document.
Figure 8:
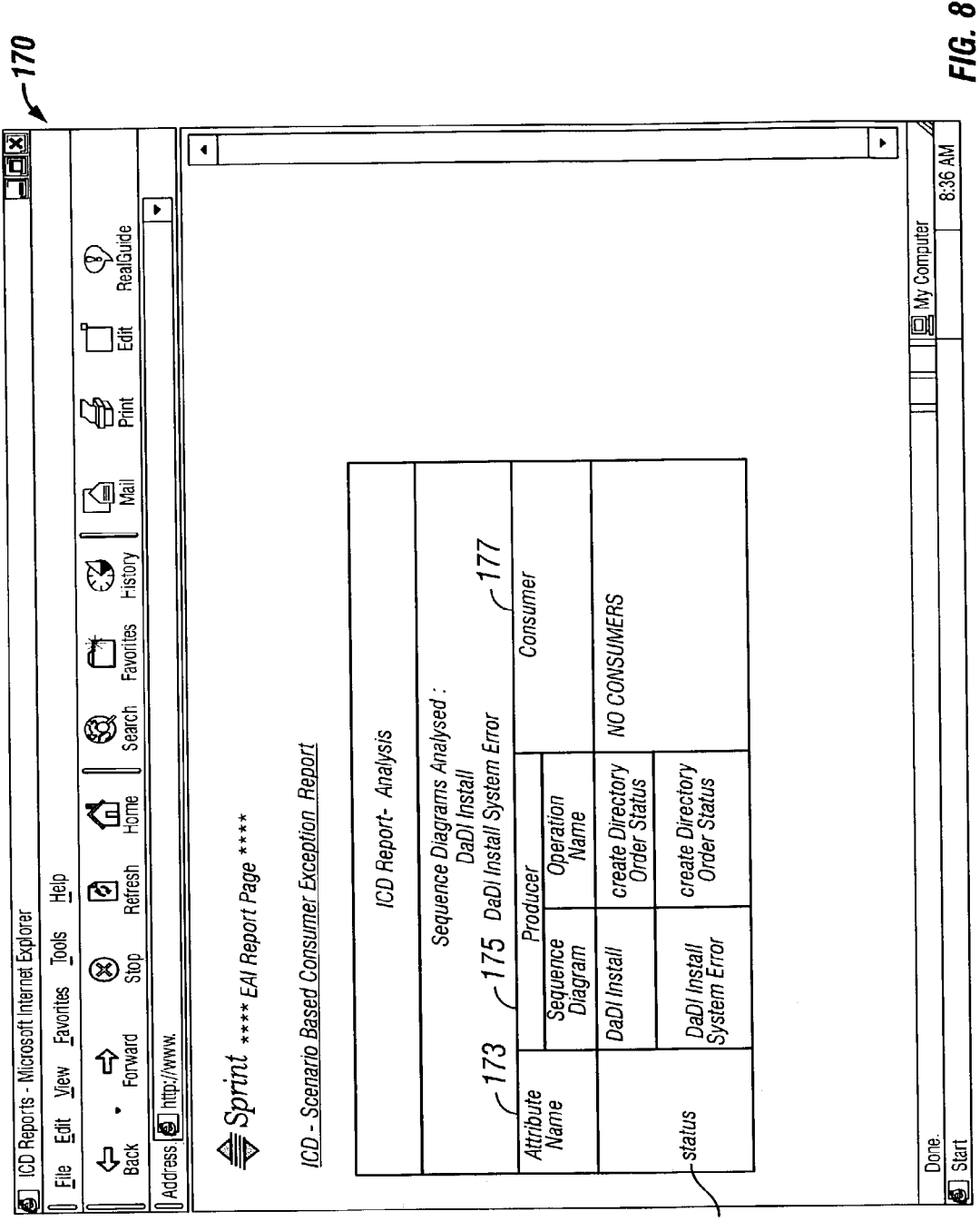
FIG. 8 is a consumer exception report constructed by applying the method of FIG. 4a to a selected portion of an ICD document.

Turning momentarily to FIGS. 6, 7 and 8, in FIG. 6, a producer/consumer map 155, in FIG. 7, a producer exception report 160 and, in FIG. 8, a consumer exception report 170, respectively generated by applying the method of FIG. 4 to a portion of the analysis ICD document 48 may now be seen, again as it is graphically displayed to the user by the analysis data validation tool 36. The producer/consumer map 155 is a data attribute-by-data attribute listing for a selected portion of the analysis ICD document 48. The producer/consumer map 155 lists each data attribute identified during the examination of the selected portion of the analysis ICD document 48. For each data attribute identified, the producer/consumer map 155 also identifies each producer and consumer of the data attribute by sequence diagram and operation name. It should be noted that, in the embodiment of the invention illustrated in FIG. 6, the producer/consumer map 155 identifies the producers, consumers and modifiers of each data attribute. Modifiers of a data attribute are identified by usage of the UPDATE operation. However, it should be noted that, in other embodiments of the invention, the UPDATE operation is treated as a consumer operation. Having eliminated the category of modifiers of data, these embodiments of the invention would identify only producers and consumers of data.

The producer/consumer map 155 is a scenario-based report generated from an analysis of a pair of sequence diagrams, the first being the "DADL Install" sequence diagram and the second being the "DADL Install System Error" sequence diagram. The producer/consumer map 155 is configured to include a first (or "attribute") column 157, a second (or "producer") column 158, a third (or "consumer") column 159 and, if desired, a fourth (or "modifier") column 161. During generation of the producer/consumer map, a row is assigned to each discrete data attribute identified. For example, FIG. 6 shows that, during generation of the producer/consumer map 155, row 156 is assigned to data attribute "directoryMsg." If multiple usages of a data attribute occur, the row is divided into plural sub-rows, one corresponding to each usage thereof. For example, FIG. 6 shows that, during generation of the producer/consumer map 155, the row 156 is divided into first, second, third and fourth sub-rows, one corresponding to the first usage of the data attribute in the DADL Install sequence diagram, one corresponding to the second usage of the data attribute in the DADL Install sequence diagram, one corresponding to the first usage of the data attribute in the DADL Install System Error sequence diagram and one corresponding to the second usage of the data attribute in the DADL Install System Error sequence diagram.

The producer/consumer map 155 also describes each usage of each data attribute. To do so, the producer, consumer and modifier columns 158, 159 and 161 are each divided into first and second sub-columns, one for identifying the sequence diagram in which a data attribute was used and the other identifying the operation conducted using the data attribute. For example, the producer/consumer map 155 indicates that the attribute "directoryMsgr" was consumed three times— once during the operation "retrieve Directory Message Information" in sequence diagram "DADL Install", once during the operation "retrieve Directory Msg" in sequence diagram "DADL Install" and once during operation "retrieve Directory Message Information" in sequence diagram "DADL Install System Error."

The producer exception report 160 illustrated in FIG. 7 shows data that is consumed but not produced. Such a condition would cause an error in the system because data cannot be read before it is created. It should be noted, however, that a data attribute listed in a producer exception report may actually be written by another method but using a different name. This is inconsistent but may not cause an error if both attribute names are mapped to the correct table and field in the database. Nevertheless, it would be displayed in the producer exception report 160 to encourage consistent naming of data attributes. Conversely, the consumer exception report 170 illustrated in FIG. 8 shows data that is produced but never consumed. While such a condition will not necessarily cause a system error, oftentimes, it causes system resources to be consumed unnecessarily. Again, the data attribute may actually be read by another method but using a different name but, as before, the data attribute is displayed in the consumer exception report 170 to encourage consistent naming of data attributes.

Both the producer exception report 160 and the consumer exception report 170 illustrated in FIGS. 7 and 8, respectively, are scenario-based reports generated from an analysis of a pair of sequence diagrams, the first being the "DADL Install" sequence diagram and the second being the "DADL Install System Error" sequence diagram. Both the producer and consumer exception reports 160 and 170 are configured to include a first (or "attribute") column 163, 173, a second (or "producer") column 165, 175 and a third (or "consumer") column 167, 177. During generation of the producer exception report 160, a row is assigned to each discrete data attribute having a consumer but no producer. For example, in FIG. 7, row 162 is assigned to data attribute "directoryOrder." Similarly, during generation of the consumer exception report 170, a row is assigned to each discrete data attribute having a producer but no consumer. Again, for example, in FIG. 8, row 172 is assigned to data attribute "status." If multiple uses of a data attribute occur, the row is divided into plural sub-rows, one corresponding to each use thereof.

The producer and consumer exception reports 160 and 170 also describe the usage of the data attributes. To do so, the columns corresponding to a use of a data attribute are divided into first and second sub-columns, one identifying the sequence diagram in which the data attribute was used and the other identifying the operation conducted using the data attribute. For example, the producer exception report 160 illustrated in FIG. 7 indicates that the attribute "directoryOrder" was consumed twice—once during the operation "RETRIEVE by PON and VER" in sequence diagram "DADL Install" and once during operation "RETRIEVE by PON and VER" in sequence diagram "DADL Install System Error—but never produced. Similarly, the consumer exception report 170 illustrated in FIG. 8 indicates that the attribute "status" was produced twice—once during the operation "CREATE Directory Order Status" in sequence diagram "DADL Install" and once during operation "CREATE Director Order Status" in sequence diagram "DADL Install System Error—but never consumed.

Figure 1:
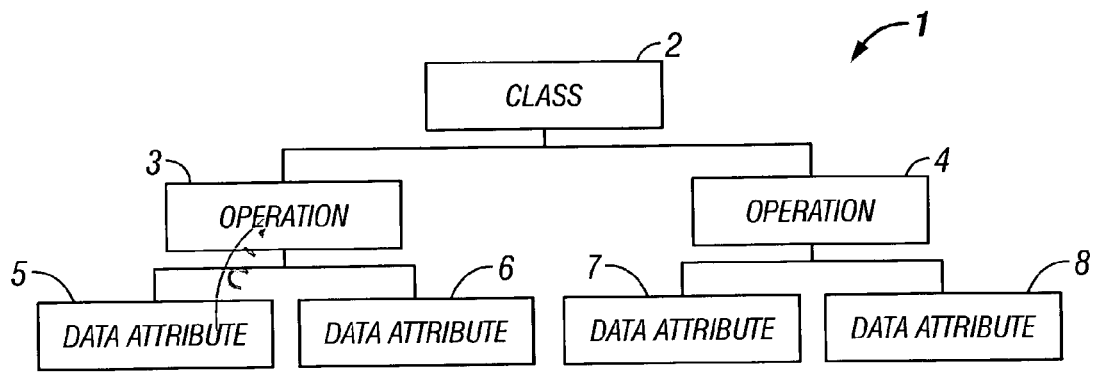
FIG. 1 is a hierarchical diagram of an ICD document used to model an enterprise.
Figure 9:
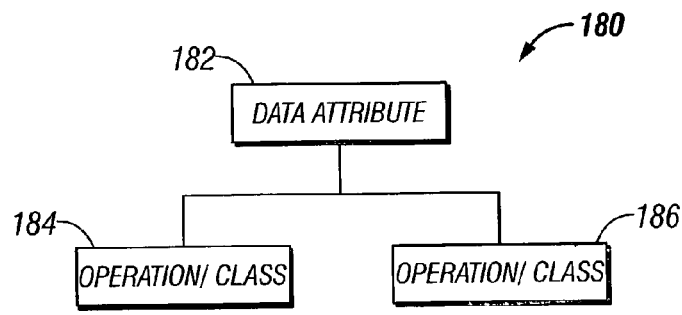
FIG. 9 is an inverted hierarchical diagram of an ICD document used to model an integrated enterprise.

It should now be appreciated that, in contrast to the hierarchical configuration of the ICD document 1 illustrated in FIG. 1, both the producer exception report 160 and the consumer exception report 170 are configured in an inverted hierarchical arrangement. Such an inverted hierarchical arrangement is shown in FIG. 9. As may now be seen, an exception report 180, for example the producer exception report 160 or the consumer exception report 170, is comprised of plural data attribute exceptions, one of which is shown in FIG. 9 as data attribute 182. Each data attribute exception 182 is either a data attribute that is consumed but not produced or produced but not consumed. The behavior of the data attribute exception 182 is comprised of one or more excepting operations. By way of example, the data attribute exception 182 is shown has having first and second excepting operations 184 and 186. If desired, the behavior of the data attribute exception may be described by the excepting operations and the sequence diagrams in which the exception operation occurred. For example, the consumer exception report 170 lists a single data attribute, "status" and a pair of excepting behaviors, operation "CREATE Directory Order Status" in sequence diagram "DADL Install" and operation "CREATE Directory Order Status" in sequence diagram "DADL Install System Error."

Returning now to FIG. 4a, a method of analyzing application-database operations within the analysis ICD document 48 using the analysis data validation tool 36 will now be described in greater detail. Again, it should be clearly understood that the techniques disclosed herein are also suitable for use in an analysis of the design ICD document 50 using the design data analysis tool 38. Prior to commencing the description of the disclosed method of analyzing application-database operations for a model of an enterprise, however, it should be noted that the method by which the analysis data validation tool 36 acquires data from the selected sequence diagrams and/or selected calls is described in relation to the graphical representation of the sequence diagram 151 illustrated in FIG. 5. It should be clearly understood that the invention has been described in this manner for clarity purposes. When physically embodied, however, the analysis data validation tool 36 would analyze the selected sequence diagrams and/or selected calls thereof in the form that they are maintained in the memory subsystem 30.

As described herein, the analysis data validation tool 36 is used for evaluating a selected portion of the analysis ICD document 48. Oftentimes, the analysis data validation tool 36 is used to evaluate a scenario, i.e., a subset of the sequence diagrams which collectively form the analysis ICD document 48. For example, FIGS. 6, 7 and 8 respectively illustrate a producer/consumer map, a producer exception report and a consumer exception report generated for a scenario comprised of sequence diagrams "DADL Install" and "DADL Install System Error." However, it should be clearly understood that the analysis data validation tool 36 is equally suitable for evaluating all of the sequence diagrams which collectively form the analysis ICD document 48.

The method commences at step 70 and, at step 72, a first portion of the analysis ICD document 48 is selected for examination. For example, a scenario comprised of first and second sequence diagram, more specifically, the aforementioned "DADL Install" and "DADL Install System Error" sequence diagrams may be selected at step 72 for further examination. The method then proceeds to step 74 where generation of a producer/consumer map, a producer exception report and a consumer exception report for the selected portion of the analysis ICD document 48 is commenced. While, in the description that follows, only a producer/consumer map, a producer exception report and a consumer exception report are generated for the selected portion of the analysis ICD document 48, it should be noted that the analysis data validation tool 36 may be used to generate other reports based upon its analysis of the selected portion of the analysis ICD document 48. Furthermore, while, in the embodiment of the invention disclosed herein, the analysis and design ICD documents 48 and 50 are validated by a discrete tool, specifically, the ICD standards validation tool 34, it is contemplated that, in an alternate embodiment of the invention, the functionality residing within the ICD standards validation tool 34 may instead reside within the analysis data validation tool 36 and/or the design data validation tool 38, for example, by modifying the disclosed technique such that, subsequent to its selection at step 78, each call is checked against a set of rules which collectively define the ICD standard to determine whether the call complies with the ICD standard.

Upon commencing generation of a producer/consumer map, a producer exception report and a consumer exception report for the selected portion of the analysis ICD document 48 at step 74, the method proceeds to step 76 for selection of a first sequence diagram of a selected portion of the analysis ICD document 48 and on to step 78 for selection of a first call of the selected sequence diagram. At step 80, the method determines if the selected call is an application-to-database call. In this regard, it is noted that applications 12a through 12h do not access the shared databases 22 and 24 directly. Rather, messages to/from the applications 12a through 12h are passed through the workflow broker 16. It should be further noted that the document being validated is the analysis ICD document 48. As accesses to the databases are at the logical level, the information broker 20 would be the source or target of an application-to-database call. Thus, an application-to-database call may more accurately be referred to as a WB-to-IB call.

As may be seen in FIG. 5, every component of a sequence diagram, for example, the sequence diagram 151, is identified. To determine if the selected call is a WB-to-IB call, the identity of the source and target components of the call are checked. If the source and the target components of the selected call are not the WB 16 and the IB 20, the method determines that the selected call is not a WB-to-IB call. The method would then proceed to step 82 where a next call of the selected sequence diagram would be selected and then return to step 80 to again determine if the selected call is a WB-to-IB call.

Returning to step 80, if the analysis data validation tool 36 determines that the selected call is a WB-to-IB call, the method proceeds to step 84 where the analysis data validation tool 36 examines the selected WB-to-IB call to determine if the call contains one or more data attributes. In accordance with the convention used in constructing the sequence diagrams of the analysis and design ICD documents 48 and 50, the alphanumeric character "(" indicates the start of a string of one or more data attributes while the alphanumeric character ")" indicates the end of a string of one or more data attributes. Accordingly, at step 84, the analysis data validation tool 36 examines the call to determine if it contains both of the aforementioned characters in the sequence "(, . . . ,)." If the analysis data validation tool 36 determines that the call fails to have this character sequence, the analysis data validation tool 36 concludes that the call does not contain a data attribute and the method will proceed to step 82 for further processing in the manner previously described. If, however, the analysis data validation tool 36 determines that the call has this character sequence, the analysis data validation tool 36 concludes that the call contains at least one data attribute and the method proceeds to step 86 for further processing.

Proceeding on to step 86, a determination is made as to whether the selected WB-to-IB call produces or consumes data. As defined herein, a call produces data if the operation conducted thereby writes data to the database. Conversely, a call consumes data if the operation conducted thereby reads data from the database. In accordance with the ICD standard utilized herein, the operation CREATE writes data to the database. Thus, any call using the operation CREATE produces data. In further accordance with the ICD standard utilized herein, the operation RETRIEVE reads data from the database, the operation UPDATE removes data from the database for subsequent replacement by new data and the operation DELETE removes data from the database. Thus, any call using the operations RETRIEVE, UPDATE or DELETE consume data. Accordingly, at step 86, the analysis data validation tool 36 scans the selected call and, based upon an examination of the first character string subsequent to the start of the call, the analysis data validation tool 36 will determine the type of operation to be performed by the call and, based upon the type of operation to be conducted, will further determine whether the selected call produces data or consumes data.

It should be readily appreciated that the UPDATE operation may be viewed by some as involving both the consumption of data (the original data initially removed from the database) and the production of data (the new data subsequently placed in the database). Thus, as previously set forth, in alternate embodiments of the invention, the method may be configured such that the producer/consumer map to either identify: (1) produced and consumed data; or (2) produced, consumed and modified data. Of the two, the method disclosed in FIG. 4a will generated a producer/consumer map which does not identify modified data. However, the disclosed technique may be easily varied to also identify modified data. To do so, a separate (or "modifier") column should be added to the producer/consumer map and operation information added to that column whenever a data attribute is used in association with an UPDATE operation.

Furthermore, while it would seem that a wide variety of other character strings could potentially appear as the name of the operation to be executed by the call, it should be noted that, at step 86, the analysis data validation tool 36 need only select between the aforementioned CREATE, RETRIEVE, UPDATE and DELETE ("CRUD") operations. Any character strings which do not conform to a defined operation were previously identified by the ICD standards validation tool 34 and corrected prior to execution of the analysis data validation tool 36. Defined operations other than CRUD operations, for example, the NOTIFY operation contained in the call 152-3, are not part of a WB-to-IB operation and would, therefore, have been eliminated from further processing at step 80.

Returning to step 86, upon determining that the selected call produces data, the method proceeds to step 87 for selection of a first data attribute of the data producing call. To select the first data attribute of the selected call, the analysis data validation tool 36 scans the data attribute portion of the selected call for the occurrence of the character "," or ")" used to indicate the end of a data attribute. The occurrence of this character indicates that the preceding characters (either to the prior occurrence of the character "," or the character "(" indicating the start of the data attributes portion is the name of a data attribute. For example, the call 152-2 has one data attribute, more specifically, the data attribute "orderStorageType" Conversely, the call 152-7 has two data attributes, more specifically, the data attributes "orderId" and "orderStatus". Of course, other character or character strings may be used to indicate the start or end of a data attribute. For example, in U.S. patent application Ser. No. 10/285,938 entitled "Inter-Application Validation Tool For Use In Enterprise Architecture Modeling" and previously incorporated by reference, the character string ":string" is used to indicate the end of a data attribute. Finally, if the analysis data validation tool 36 identifies the occurrence of the character string "details" in the data attributes portion of the call, the analysis data validation tool 36 will review a details portion (not shown) of the analysis ICD document 48 being analyzed for a detail having a name matching the name of the detail identified in the data attributes portion of the call. The matching detail will be comprised of a group of data attributes. The analysis data validation tool 36 will then treat each data attribute contained in the matching detail of the details portion of the ICD document as if it was contained in the data attributes portion of the call and proceed in the manner hereinabove described to select a first data attribute therefrom.

Figure 4B:
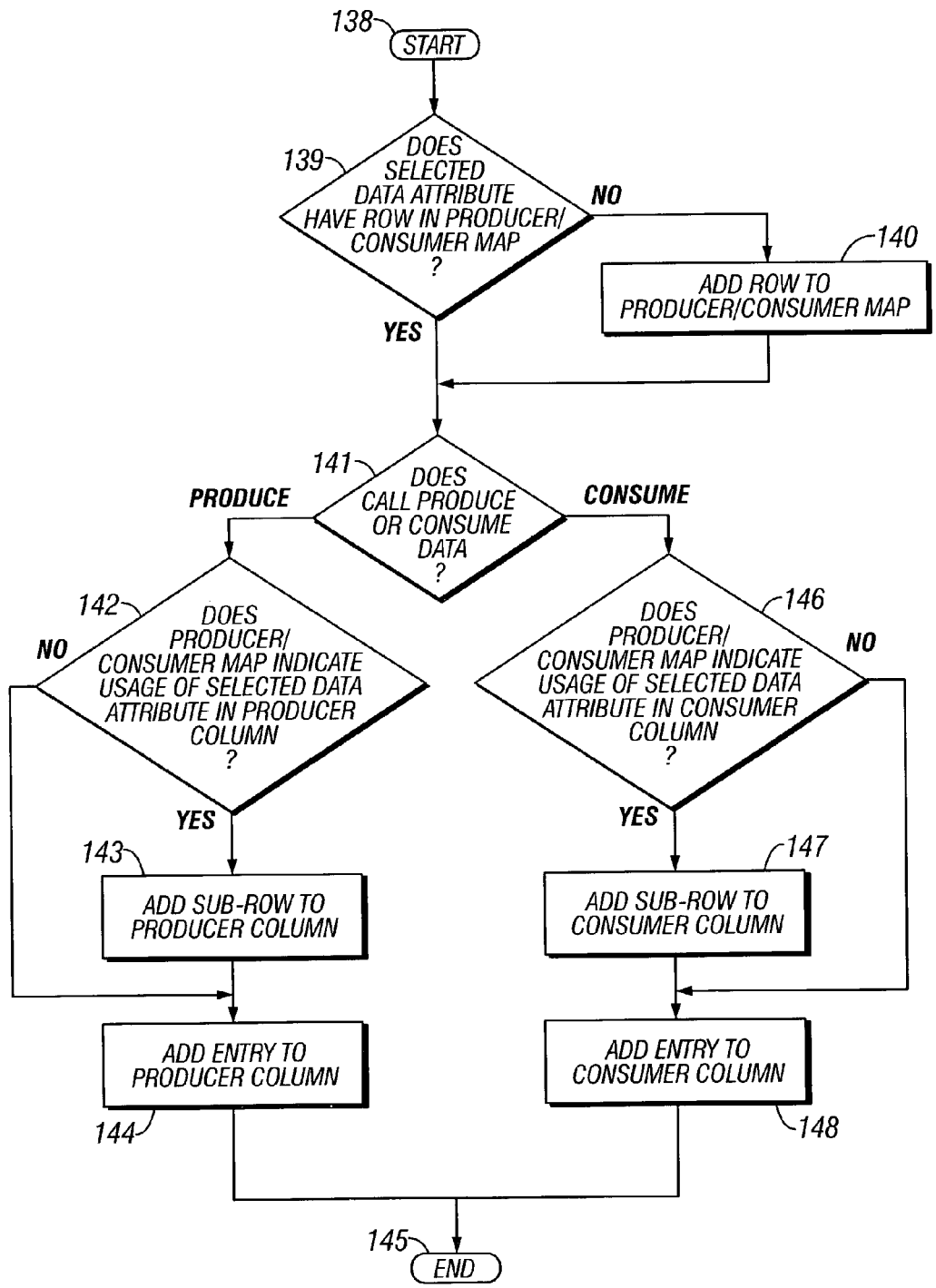

After selecting a first data attribute of the data producing call at step 87, the method proceeds to step 88 where the producer/consumer map subroutine of FIG. 4b is executed. By executing the producer/consumer map subroutine, information related to the selected attribute is added to the producer/consumer map. Having processed the selected attribute in connection with construction of the producer/consumer map, the selected attribute may now be processed in connection with the construction of the producer exception and consumer exception reports. Accordingly, after execution of the producer/consumer map subroutine at step 88, the method proceeds to step 89 where the analysis data validation tool 36 determines if the selected data attribute is on a list (not shown) of deleted data attributes maintained in the memory subsystem 30. The list is maintained to prevent an unevenly used data attribute from inadvertently appearing on a producer or consumer exception report. For example, it is entirely acceptable that a data attribute is produced once and consumed many times. If the selected data attribute does not appear on the list of deleted data attributes, the method will then proceed to step 90 where the analysis data validation tool 36 determines if there is an existing entry in the producer exception report under construction which corresponds to the selected data attribute. If there is not an existing entry in the producer exception report under construction which corresponds to the selected data attribute, the method continues on to step 92.

At step 92, the analysis data validation tool 36 determines if there is an existing entry in the consumer exception report under construction which corresponds to the selected data attribute. If an existing entry in the consumer exception report under construction which corresponds to the selected data attribute is not found at step 92, the method proceeds to step 94 where an entry is added, to the consumer exception report under construction, for the selected data attribute. For example, for the call 152-2, the selected data attribute would be "orderStorageType" and, if there are not yet any entries for the selected data attribute, an entry corresponding to this data attribute would be added to the consumer exception report being constructed.

Upon adding a new entry to the consumer exception report at step 94 or upon determining, at step 92, that the selected data attribute corresponds to an existing entry in the consumer exception report, the method proceeds to step 96 where the analysis data validation tool 36 adds a first section (if the entry is newly generated) or a subsequent section (if the entry was previously generated) to the entry. The name of the sequence diagram of which the selected data attribute is part of the selected call and the name of the operation conducted by the selected call are then placed in that section of the entry. For example, for the selected call 152-2 containing the selected data attribute "orderStorageType", the section would be comprised of a first field identifying "DADL Install" as the sequence diagram 151 and "CREATE Order" as the operation conducted by the call 152-2. In this regard, it should be noted that CREATE is the name of the operation while "Order" is the name of the data aggregate subject of the operation.

Returning momentarily to step 90, if the selected data attribute of the data producing call does correspond to an entry in the producer exception report, the method will instead proceed to step 98 where, because both a data consuming and a data producing operation which utilize the selected data attribute have been identified, the entry corresponding to the selected data attribute is deleted from the producer exception report under construction and, at step 100, the deleted data attribute is added to the deleted data attribute list. Upon adding the deleted data attribute to the deleted data attribute list at step 100 or upon adding the sequence diagram and operation of the selected call containing the selected data attribute to the newly added section of the consumer exception report at step 96, the method proceeds on to step 102 where the analysis data validation tool 36 determines if the selected data attribute is the last data attribute for the selected call. If it is determined at step 102 that there are additional data attributes for the selected call, the method proceeds to step 104 for selection of a next data attribute of the selected call and then returns to step 89 for further processing of the newly selected data attribute in the manner previously described. If, however, it is determined at step 102 that the selected data attribute is the last data attribute for the selected call, the method will instead proceed to step 106 where the analysis data validation tool 36 determines if the selected call is the last call for the selected sequence diagram.

Returning momentarily to step 86, upon determining that the selected call consumes data, the method proceeds to step 108 for selection of a first data attribute of the data consuming call. To select the first data attribute of the selected data consuming call, the analysis data validation tool 36 again scans the data attribute portion of the selected data consuming call in the manner previously described to identify a first data attribute thereof. After selecting a first data attribute of the data consuming call at step 108, the method proceeds to step 109 where the producer/consumer map subroutine of FIG. 4b is executed. By executing the producer/consumer map subroutine, information related to the selected attribute is added to the producer/consumer map. Having processed the selected attribute in connection with construction of the producer/consumer map, the selected attribute may now be processed in connection with the construction of the producer exception and consumer exception reports. Accordingly, after execution of the producer/consumer map subroutine at step 109, the method proceeds to step 110 where the analysis data validation tool 36 determines if the selected data attribute is on the list of deleted data attributes maintained in the memory subsystem 30. If the selected data attribute does not appear on the list of deleted data attributes, the method will then proceed to step 112 where the analysis data validation tool 36 determines if there is an existing entry in the consumer exception report under construction which corresponds to the selected data attribute. If there is not an existing entry in the producer exception report under construction which corresponds to the selected data attribute, the method continues on to step 114.

At step 114, the analysis data validation tool 36 determines if there is an existing entry in the producer exception report under construction which corresponds to the selected data attribute. If an existing entry in the producer exception report under construction which corresponds to the selected data attribute is not found at step 114, the method proceeds to step 116 where an entry is added, to the producer exception report under construction, for the selected data attribute. Upon adding a new entry to the producer exception report at step 116 or upon determining, at step 114, that the selected data attribute corresponds to an existing entry in the producer exception report, the method proceeds to step 118 where the analysis data validation tool 36 adds a first section (if the entry is newly generated) or a subsequent section (if the entry was previously generated) to the entry in the producer exception report. The name of the sequence diagram of which the selected data attribute is part of the selected call and the name of the operation conducted by the selected call are then placed in that section of the entry of the producer exception report.

Returning momentarily to step 112, if the selected data attribute of the data producing call does correspond to an entry in the consumer exception report, the method will instead proceed to step 120 where, because both a data consuming and a data producing operation which utilize the selected data attribute have been identified, the entry corresponding to the selected data attribute is deleted from the consumer exception report under construction and, at step 122, the deleted data attribute is added to the deleted data attribute list. Upon adding the deleted data attribute to the deleted data attribute list at step 122 or upon adding the sequence diagram and operation of the selected call containing the selected data attribute to the newly added section of the producer exception report at step 118, the method proceeds on to step 124 where the analysis data validation tool 36 determines if the selected data attribute is the last data attribute for the selected call. If it is determined at step 124 that there are additional data attributes for the selected call, the method proceeds to step 126 for selection of a next data attribute of the selected call and then returns to step 109 for further processing of the newly selected data attribute in the manner previously described.

If it is determined at step 102 that the selected data attribute is the last data attribute for the selected data producing call or if it is determined at step 124 that the selected data attribute is the last data attribute for the selected data consuming call, the method will proceed to step 106 where the analysis data validation tool 36 determines if the selected call is the last call for the selected sequence diagram. If it is determined at step 106 that there are additional calls for the selected sequence diagram, the method proceeds to step 128 for selection of a next call for the selected sequence diagram and then returns to step 80 for further processing of the newly selected call in the manner previously described.

If, however, it is determined at step 106 that the selected call is the last call for the selected sequence diagram, the method proceeds to step 129 where the analysis data validation tool 36 determines whether the selected sequence diagram is the last sequence diagram of the selected portion of the ICD document. If it is determined that there are additional sequence diagrams of the selected portion of the ICD document to be analyzed, the method proceeds to step 130 for selection of a next sequence diagram of the selected portion of the ICD document. The method then returns to step 78 for further processing of the newly selected sequence diagram in the manner previously described. If, on the other hand, it is determined at step 129 that the selected sequence diagram is the last sequence diagram of the selected portion of the analysis ICD document 48 being analyzed, the analysis data validation tool 36 determines that construction of the producer/consumer map, producer exception report and the consumer exception report are complete. Once constructed, the analysis data validation tool 36 may generate a display of the constructed consumer/producer report, producer exception report and consumer exception report on a monitor or similar device for subsequent analysis in the manner more fully described below.

Upon determining, at step 129, that the selected sequence diagram is the last sequence diagram to be analyzed for the selected portion of the analysis ICD document 48 and that construction of the producer/consumer map, the producer exception report and the consumer exception report for the analysis ICD document 48 are complete, the method proceeds to step 131 where the producer and consumer exception reports for the ICD document are analyzed. For example, the producer exception report may indicate that a first data attribute is consumed but never produced while the consumer exception report may indicate that a second data attribute was produced but never consumed. Analysis of the producer and consumer exception reports continue at step 132 where it is determined if one or more producer and/or consumer exceptions are identified in the producer and/or consumer exception reports. If one or more producer and/or consumer exceptions are identified in the producer and/or consumer exception reports, the method proceeds to step 133 where it is determined that the shared databases 22, 24 have not yet been integrated into the enterprise 10.

The method then proceeds to step 134 where the shared databases 22, 24 are integrated into the enterprise 10 by correcting the analysis ICD document 48 based upon the analysis of one or more of the producer/consumer map 155, the producer exception report 160 and the consumer exception report 170. By correcting the analysis ICD document 48 in this manner, an integrated analysis model of the enterprise is thusly produced. As contemplated herein, a typical revision to the analysis ICD document 48 would encompass the addition, deletion or revision of one or more of the data attributes which form part of the calls set forth in the various sequence diagrams of the analysis ICD document 48. For example, if the producer exception report indicates that a data attribute contained in an object subject of a RETRIEVE operation was consumed but never produced, the call containing the CREATE operation which created the object may be modified to include the data attribute. As with the construction thereof, the analysis ICD document 48 is revised using the UML modeling tool 32. After correcting the analysis ICD document 48 at step 134 based upon an analysis of the producer/consumer map 155, the producer exception report 160 and the consumer exception report 170, the method returns to step 74 for further processing of the selected portion of the analysis ICD document 48 in the manner previously described.

If, however, it is determined at step 132 that processing of the selected portion of the analysis ICD document 48 does not identify any producer or consumer exceptions, the method will instead proceed to step 135 where the analysis ICD document 48 is deemed to be validated. More specifically, upon applying the analysis data validation tool 36 to the analysis ICD document 48, analyzing the results of the producer/consumer map, the producer exception report and/or the consumer exception report generated thereby to identify any improper associations of data attributes with calls and revising, if necessary, the analysis ICD document 48 to remove such improper associations such that a subsequent application of the analysis data validation tool 36 to the analysis ICD document 48 will produce neither producer exceptions nor consumer exceptions, the analysis ICD document 48 may be deemed as having been validated by the analysis data validation tool 36. Upon validating the analysis ICD document 48 at step 135, the method then ends at step 136.

It should be further noted that, by revising the analysis ICD document 48 to remove the inaccuracies which result in the generation of producer and/or consumer exception reports, the quality of the model of the integrated enterprise 10 being constructed is enhanced. As a result, when the integrated enterprise 10 is constructed using the analysis ICD document 48 and other modeling documents as a guide, the likelihood of errors occurring during the testing and/or operation of the integrated enterprise 10 is reduced. In particular, when used in the manner herein described, the analysis data validation tool 36 reduces the likelihood of errors occurring within the integrated enterprise 10, for example, during the testing and/or operation thereof, when asked to perform a task which involves an interaction between an application and a shared database.

Referring next to FIG. 4b, the producer/consumer map subroutine by which the producer/consumer map 155 is constructed will now be described in greater detail. The producer/consumer map subroutine starts at step 138 and, at step 139, the method determines if the selected data attribute has already been assigned a row in the producer/consumer map under construction. If it is determined that the selected data attribute has not been assigned a row in the producer/consumer map being constructed, in other words, if it is determined that this is the first detection of the selected data attribute, the method proceeds to step 140 where a new row is added to the producer/consumer map under construction. Upon initially adding a row to the producer/consumer map, the name of the selected data attribute is placed in the data attribute column, the term "NO PRODUCERS" is placed in the producers column, the term "NO CONSUMERS" is placed in the consumers column and, if a modifiers column is being constructed, the term "NO MODIFIERS" is placed in the modifiers column. Upon adding a new row to the producer/consumer map being constructed, or upon determining at step 139 that the producer/consumer report already has a row assigned to the selected data attribute, the method proceeds on to step 141 for further processing.

At step 141, the method again checks whether the selected call containing the selected data attribute produces or consumes data. If the selected call produces data, the method proceeds on to step 142 where it is determined if the producer/consumer map describes an existing usage of the selected data attribute in the producers column of the producer/consumer map. If the producer/consumer map describes an existing usage of the selected data attribute in the producers column of the producer/consumer map, the method proceeds to step 143 where a new sub-row is added to the producers column of the producer/consumer map. Upon adding a new sub-row to the producers column of the producer/consumer map at step 143 or upon determining at step 142 that the producer/consumer map does not describe an existing usage of the selected data attribute in the producers column of the producer/consumer map, the method proceeds to step 144 where an entry is placed in the portion of the row (or sub-row, if a prior usage of the selected data attribute was not described by the producer/consumer map) for the selected data attribute corresponding to the producer column. The entry placed in the producer/consumer map describes a usage of the selected data attribute and is comprised of a first field which contains the name of the sequence diagram of which the selected data attribute is part of the selected call and a second field which contains the name of the operation conducted by the selected call are then placed in that section of the entry. Of course, if the entry describes the first usage of the selected attribute as a producer, the term "NO PRODUCERS" should be deleted from the row before placing the entry therein. After adding an entry to the producer column of the producer/consumer map at step 144, the producer/consumer map subroutine ends at step 145.

Returning to step 141, if it is determined that the selected call consumes data, the method will instead proceed on to step 146 where it is determined if the producer/consumer map describes an existing usage of the selected data attribute in the consumers column of the producer/consumer map. If the producer/consumer map describes an existing usage of the selected data attribute in the consumers column of the producer/consumer map, the method proceeds to step 147 where a new sub-row is added to the consumers column of the producer/consumer map. Upon adding a new sub-row to the consumers column of the producer/consumer map at step 147 or upon determining at step 146 that the producer/consumer map does not describe an existing usage of the selected data attribute in the consumers column of the producer/consumer map, the method proceeds to step 148 where an entry is placed in the portion of the row (or sub-row, if a prior usage of the selected data attribute was not described by the producer/consumer map) for the selected data attribute corresponding to the consumers column. The entry placed in the producer/consumer map describes a usage of the selected data attribute and is comprised of a first field which contains the name of the sequence diagram of which the selected data attribute is part of the selected call and a second field which contains the name of the operation conducted by the selected call are then placed in that section of the entry. Of course, if the entry describes the first usage of the selected attribute as a consumer, the term "NO CONSUMERS" should be deleted from the row before placing the entry therein. After adding an entry to the consumers column of the producer/consumer map at step 148, the producer/consumer map subroutine ends at step 145.

Thus, there has been described and illustrated herein, various data integration techniques suitable for use in enterprise architecture modeling. By analyzing operations to a shared database forming part of the a model of an enterprise based upon the usage of data attributes, the shared database may be integrated into the enterprise. However, those skilled in the art should recognize that numerous modifications and variations may be made in the techniques disclosed herein without departing substantially from the spirit and scope of the invention. Accordingly, the scope of the invention should only be defined by the claims appended hereto.

What is claimed is:

1. A method of modeling an enterprise having a shared database, comprising:
    constructing an interim model of said enterprise;
    analyzing modeled producers and modeled consumers of modeled data within said interim model of said enterprise;
    identifying modeled data which is consumed in the model but not produced in the model based on the analyzing;
    identifying modeled data which is produced in the model but not consumed in the model based on the analyzing; and
    producing an integrated model of said enterprise using said analysis of modeled producers and modeled consumers of modeled data within said interim model of said enterprise to integrate said shared database into said interim model of said enterprise.

2. The method of claim 1, wherein analyzing modeled producers and modeled consumers of modeled data within said interim model of said enterprise further comprises analyzing modeled calls to said shared database on a data attribute-by-data attribute basis.

3. The method of claim 1, and further comprising integrating said shared database into said interim model of said enterprise to produce said integrated model of said enterprise by revising said interim model of said enterprise such that said integrated model of said enterprise produces said data identified as being consumed in the model but not produced in the model and consumes said data identified as being produced in the model but not consumed in the model.

4. A method of constructing an integrated model of an enterprise having a shared database, comprising:
    constructing an interim model of said enterprise, said interim model comprised of a set of sequence diagrams;
    selecting a scenario of said interim model of said enterprise for further analysis, said scenario comprised of a subset of said set of sequence diagrams;
    generating, from said scenario, a map of data producers and data consumers, said map identifying at least one data attribute contained in said scenario, each producer of each of said at least one identified data attribute and each consumer of each of said at least one data attribute;
    generating, from said scenario, an exception for each one of said at least one data attribute produced but not consumed or consumed but not produced;
    producing said integrated model of said enterprise by integrating said interim model of said enterprise from said generated map of data producers and data consumers and said generated exception for each one of said at least one data attribute produced but not consumed or consumed but not produced.

5. The method of claim 4, wherein integrating said interim model of said enterprise from said generated map of data producers and data consumers and said generated exception for each one of said at least one data attribute produced but not consumed or consumed but not produced further comprises:
    modifying usage of each one of said at least one data attribute contained in said scenario and identified by one of said at least one generated exception as being produced but not consumed or consumed but not produced.

6. For an enterprise having at least two applications and a database shared between said at least two applications, a method of integrating a model of said enterprise, comprising:
    analyzing a plurality of modeled calls between said at least two modeled applications and said modeled shared database, said plurality of modeled calls including calls of at least two call types;
    determining whether said analyzed plurality of modeled calls contains a modeled data imbalance, said modeled data imbalance occurring when said analyzed plurality of modeled calls includes at least one modeled data attribute contained in at least one of said analyzed modeled calls of a first one of said at least two call types but not contained in any of said analyzed plurality of modeled calls of a second one of said at least two call types; and revising said model of said enterprise to remove said modeled data imbalance when said analyzed plurality of modeled calls contains the modeled data imbalance.

7. The method of claim 6, wherein said first one of said at least two call types is data producing modeled calls.

8. The method of claim 6, wherein said first one of said at least two call types is data producing modeled calls and said second one of said at least two call types is data consuming modeled calls.

9. The method of claim 6, wherein said first one of said at least two call types is data consuming modeled calls.

10. The method of claim 6, and further comprising generating an exception report listing said modeled data attributes identified as being contained in at least one of said analyzed plurality of modeled calls of said first type but not contained in any of said analyzed plurality of modeled calls of said second type.

11. The method of claim 10, wherein said first one of said at least two calls types is data producing modeled calls and said exception report listing said modeled data attributes identified as being contained in at least one of said analyzed plurality of modeled calls of said first type but not contained in any of said analyzed plurality of modeled calls of said second type is a consumer exception report.

12. The method of claim 10, wherein said first one of said at least two call types is data consuming modeled calls and said exception report listing said modeled data attributes identified as being contained in at least one of said analyzed plurality of modeled calls of said first type but not contained in any of said analyzed plurality of modeled calls of said second type is a producer exception report.

13. The method of claim 6, and further comprising identifying at least one modeled data attribute contained in at least one of said analyzed plurality of modeled calls of said second one of said at least two call types but not contained in any of said analyzed plurality of modeled calls of said first one of said at least two call types.

14. The method of claim 13, and further comprising:
generating a first exception report listing said modeled data attributes identified as being contained in at least one of said analyzed plurality of modeled calls of said first type but not contained in any of said analyzed plurality of modeled calls of said second type; and
generating a second exception report listing said modeled data attributes identified as being contained in at least one of said analyzed plurality of modeled calls of said second type but not contained in any of said analyzed plurality of modeled calls of said first type.

15. The method of claim 14, wherein said first one of said at least two calls types is data producing modeled calls, said first exception report listing said modeled data attributes identified as being contained in at least one of said analyzed plurality of modeled calls of said first type but not contained in any of said analyzed plurality of modeled calls of said second type is a consumer exception report, said second one of said at least two call types is data consuming modeled calls and said second exception report listing said modeled data attributes identified as being contained in at least one of said analyzed plurality of modeled calls of said second type but not contained in any of said analyzed plurality of modeled calls of said first type is a producer exception report.

16. The method of claim 6, wherein revising said model of said enterprise to remove said modeled data imbalance in said analyzed plurality of modeled calls further comprises revising said model of said enterprise so that each one of said identified modeled data attributes are contained in at least one modeled call of said first call type and at least one modeled call of said second call type.

17. The method of claim 16, wherein the step of revising said model of said enterprise so that each one of said identified modeled data attributes is contained in at least one modeled call of said first call type and at least one modeled call of said second call type further comprises:
adding, to said model, at least one modeled call of said second call type;
wherein said at least one identified modeled data attribute is contained in said at least one added modeled call.

18. The method of claim 16, wherein the step of revising said model of said enterprise so that each one of said identified modeled data attributes is contained in at least one modeled call of said first call type and at least one modeled call of said second call type further comprises:
revising at least one modeled call of said second call type;
wherein said at least one revised modeled call contains said at least one identified modeled data attribute.

19. The method of claim 6, wherein revising said model of said enterprise to remove said modeled data imbalance in said analyzed plurality of modeled calls further comprises revising said model of said integrated enterprise so that each one of said identified modeled data attributes is no longer contained in any of said at least one modeled call of said first call type.

20. The method of claim 19, wherein the step of revising said model of said enterprise so that each one of said identified modeled data attributes is no longer contained in any of said at least one modeled call of said first call type further comprises deleting, from said model, at least one modeled call of said first call type.

21. The method of claim 20, wherein the step of revising said model of said enterprise so that each one of said identified modeled data attributes is no longer contained in any of said at least one modeled call of said first call type further comprises:
revising at least one modeled call of said first call type;
wherein none of said at least one revised modeled call contains any of said at least one identified modeled data attribute.

22. A method of integrating a hierarchical model of an enterprise, comprising:
inverting said hierarchical model of said enterprise to form an inverted hierarchical model of said enterprise, wherein said inverted hierarchical model of said enterprise includes an inverted hierarchical model first level identifying at least one data attribute, each one of said at least one data attribute associated with one or more operations and an inverted hierarchical model second level identifying each one of said one or more operations associated with each one of said at least one data attribute; and
analyzing said inverted hierarchical model of said enterprise;
classifying each one of said at least one operation as either a data producing type operation or as a data consuming type operation;
constructing a producer exception report based on the analyzing and classifying, the producer exception report listing each one of said at least one data attribute associated with at least one data consuming operation but not associated with any data producing operations;
constructing a consumer exception report based on said analyzing and said classifying, the consumer exception report listing each one of said at least one data attribute associated with at least one data producing operation but not associated with any data consuming operation; and modifying said hierarchical model of said enterprise based at least on said producer exception report and said consumer exception report.

23. The method of claim 22, wherein said hierarchical model of said enterprise includes a hierarchical model first level identifying at least one task to be performed by said enterprise, a hierarchical model second level identifying, for each one of said at least one task, at least one operation forming part of said task, and a hierarchical model third level identifying, for each one of said at least one operation forming part of one of said at least one task, at least one data attribute associated with said operation and wherein said second level of said inverted hierarchical model of said enterprise further identifies, for each one of said one or more operations associated with each one of said at least one data attribute, said task for which said operation was conducted in connection therewith.

24. The method of claim 22, wherein modifying said hierarchical model of said enterprise comprises modifying said hierarchical model such that each data attribute listed in said producer exception report is associated with at least one data producing operation.

25. The method of claim 22, wherein modifying said hierarchical model of said enterprise comprises modifying said hierarchical model such that each data attribute listed in said consumer exception report is associated with at least one data consuming operation.

* * * * *